United States Patent [19]
Takuma et al.

[11] Patent Number: 4,967,280
[45] Date of Patent: Oct. 30, 1990

[54] IMAGE SENSING APPARATUS HAVING AUTOMATIC FOCUSING FUNCTION OF AUTOMATICALLY MATCHING FOCUS IN RESPONSE TO VIDEO SIGNAL

[75] Inventors: Masao Takuma, Toyonaka; Toshinobu Haruki, Shijonawate; Kenichi Kikuchi, Osaka, all of Japan

[73] Assignee: Sanyo Electric Co., Ltd., Japan

[21] Appl. No.: 478,061

[22] Filed: Feb. 7, 1990

Related U.S. Application Data

[63] Continuation of Ser. No. 348,429, May 5, 1989, abandoned.

[30] Foreign Application Priority Data

May 11, 1988 [JP] Japan ................................ 63-113826
Jun. 8, 1988 [JP] Japan ................................ 63-141290
Oct. 25, 1988 [JP] Japan ................................ 63-268984

[51] Int. Cl.⁵ .......................................... H04N 5/232
[52] U.S. Cl. .................................... 358/227; 250/201.2
[58] Field of Search ................ 358/227, 225; 354/402; 250/201 AF

[56] References Cited

U.S. PATENT DOCUMENTS 3,728,482  4/1923  Wren .................... 358/227
4,484,806 11/1984  Onishi et al. .......... 358/227
4,609,944  9/1986  Nakada et al. ......... 358/227
4,638,364  1/1987  Hiramatsu ............. 358/227
4,701,782 10/1987  Duvent ................. 358/227
4,835,788  8/1989  Murashima et al. ..... 358/227
4,903,135  2/1990  Ohtake et al. ......... 358/227

FOREIGN PATENT DOCUMENTS 37661  3/1986  Japan .
105978 5/1986  Japan .

Primary Examiner—Stephen Brinich
Attorney, Agent, or Firm—Michaelson, Peter L.

[57] ABSTRACT

In a video camera having an automatic focusing function, a focus evaluating value is calculated as the sum of first and second focus evaluating values extracted using output of two filters having different cut-off frequencies, and a relative ratio of the first and second focus evaluating value is also calculated. This relative ratio is compared with a predetermined reference value. Considering a case in which the focus evaluating value is below this reference value after an object is brought into focus, even if the focus evaluating value does not change, an auto-focus operation is resumed. On the other hand, considering a case in which the relative ratio is above the reference value, even if the focus evaluating value changes, the auto-focus operation is not resumed. In addition, even if the focus evaluating value reaches a maximum in the auto-focus operation, the auto-focus operation is not terminated if the relative ratio does not reach a predetermined reference value. Furthermore, the amount of slight movement of a lens in an object change confirming operation after bringing the object into focus is switched depending on the relative ratio. Additionally, it is determined whether or not the lens correctly moves toward an in-focus position by determining the increase or decrease of the relative ratio.

23 Claims, 26 Drawing Sheets

IMAGE SENSING APPARATUS HAVING AUTOMATIC FOCUSING FUNCTION OF AUTOMATICALLY MATCHING FOCUS IN RESPONSE TO VIDEO SIGNAL

CROSS REFERENCE TO RELATED APPLICATION

This application is a continuation of copending patent application Ser. No. 07/348,429 filed on May 5, 1989, abandoned.

BACKGROUND OF THE INVENTION

1. Field of the Invention

The present invention relates generally to an image sensing apparatus, and more particularly, to an image sensing apparatus such as video camera having an automatic focusing function of automatically matching the focus relative to an object in response to a video signal obtained from an image sensor.

2. Description of the Background Art

Conventionally, in an automatic focusing apparatus used in an image sensing apparatus such as video camera, an approach utilizing a video signal itself obtained from an image sensor for evaluating a state in which the focus is controlled has been developed. According to such an approach, a lot of good characteristics can be obtained. For example, there exists no parallax. In addition, even if the depth of field is small and an object is located in the distance, the focus can be precisely matched. Furthermore, according to this approach, a specific sensor for automatic focusing need not be separately provided, so that the apparatus is very simple as a mechanism.

As such a focus control method utilizing a video signal, a control method referred to as a so-called hill climbing servo system has been conventionally known, which is disclosed in, for example, Japanese Patent Laying-Open No. 105978/1986. Briefly stated, in such a conventional method, a level of a high-frequency component of a video signal obtained from an image sensor within the range of a focusing area set in the center of a picture is A-D converted, data obtained by the conversion is integrated by one field by an integrating circuit, digital data obtained by the integration is detected as a focus evaluating value this focus evaluating value is always compared with a focus evaluating value detected one field before, and the position of a focusing lens is controlled such that the focus evaluating value always takes the maximal value.

Such an automatic focusing apparatus is adapted such that the time change of a focus evaluating value is monitored after a focusing lens is fixed once in an in-focus position and it is determined that an object changed when the amount of the change reaches a constant amount or more, to resume an automatic focusing operation.

In a auto-focus operation by such a conventional automatic focusing apparatus, the change of the focus evaluating value obtained for each field is monitored and the position of the focusing lens is controlled such that this focus evaluating value always takes a maximum value. Thus, even if the object moves after it is brought into focus once, the focus evaluating value may not change, for example, when there is an object having a higher contrast, that is, including a higher frequency component in the background. In such a case, the auto-focus operation is not resumed, although the object actually moves so that a defocused state is achieved.

Furthermore, if and when the focus evaluating value changes after the object is brought into focus, it is difficult to determine by noticing only the change of the focus evaluating value whether the distance between the object and the lens is changed so that the focus evaluating value changes or this distance is not changed but the object laterally moves or the shape of the object itself is changed so that the focus evaluating value changes. More specifically, due to horizontal movement or vertical movement of a camera relative to objects arranged at the same distance from the lens, the change in brightness or the like, the auto-focus operation may be started by the time change of the focus evaluating value even if the distance between the object and the lens is not changed. In such a case, a picture becomes unclear.

Additionally, considering a case in which an in-focus position is detected by monitoring only the change of the focus evaluating value, when a false maximal point occurs in the focus evaluating value due to noises or the like, this maximal point is liable to be erroneously judged to be the in-focus position.

An automatic focusing apparatus for issuing a command of resuming an automatic focusing operation or a command of confirming an in-focus position by passing a level of a high-frequency component of a video signal obtained from an image sensor through a plurality of filters having different cut-off frequencies and relatively comparing levels of outputs of the filters has been proposed, which is disclosed in Japanese Utility Model Laying-Open No. 37661/1986. However, according to such a conventional technique, control is made based on the difference between absolute values of focus evaluating values and this difference is not constant depending on height of the output levels, so that a high-precision automatic focusing operation can not be carried out.

Additionally, according to the conventional technique, in order to determine whether a focus evaluating value changes after an object is brought into focus by the change in distance between the object and a focusing lens or by lateral movement of the object or the change in shape of the object itself without the change in the distance, the focusing lens is moved forward and backward by a constant amount in the direction of an optical axis to achieve a slightly defocused state when the focus evaluating value changes by a constant amount or more, and it is determined whether the distance between the object and the lens is changed depending on how the focus evaluating value changes by slight movement of the lens.

Therefore, due to horizontal movement or vertical movement of a camera relative to objects arranged at the same distance from the lens, the change in brightness or the like, the focusing lens is slightly moved to achieve a defocused state by the time change of the focus evaluating value even if the distance between the object and the lens is not changed, so that a picture becomes unclear.

Additionally, in the conventional automatic focusing apparatus, a case is considered in which an object having a large high frequency component, for example, an object having black and white stripes alternately mixed moves into a sampling area set on an image sensed picture due to horizontal movement of a video camera and movement of the object. In such a case, the focus evaluating value may be increased, although the lens moves farther away from the in-focus position. On the other hand, considering a case in which the above described object having a large high frequency component moves outside of the sampling area, the focus evaluating value may be decreased, although the focusing lens approaches the in-focus position. In such situation, the focusing lens greatly moves in an erroneous direction, so that a picture becomes unclear.

SUMMARY OF THE INVENTION

Accordingly, an object of the present invention is to provide an image sensing apparatus capable of precisely resuming an automatic focusing operation even if a focus evaluating value does not change although an object moves after it is brought into focus while surely preventing the automatic focusing operation from being unnecessarily resumed when the focus evaluating value changes although the distance from the object to a lens does not change after the object is brought into focus.

Another object of the present invention is to provide an image sensing apparatus which prevents termination of an automatic focusing operation in a defocused state by erroneous judgement of a false maximal point of a focus evaluating value due to noises or the like to be an in-focus position.

Still another object of the present invention is to provide an image sensing apparatus which prevents a picture from being unclear by reducing to a minimum essential the amount of slight movement of a focusing lens in performing an operation for confirming the change of an object after the object is brought into focus.

A further object of the present invention is to provide an image sensing apparatus capable of preventing a focusing lens from moving in an erroneous direction even if an object moves into and out of a focusing area.

Briefly stated, the present invention is directed to an image sensing apparatus for automatically matching the focus relative to an object, the image sensing apparatus comprising an image sensing circuit having a focusing lens and an image sensor for generating a video signal in response to light incident from the object, a relative position changing apparatus for changing a relative position in the direction of an optical axis of the focusing lens relative to the image sensor, a first focus evaluating value detecting circuit for detecting every constant time period a level of a first high frequency component in the video signal to supply the same as a first focus evaluating value, a second focus evaluating value detecting circuit for detecting every constant time period a level of a second high frequency component including a component at a frequency which is lower than the frequency of the first high frequency component in the video signal to supply the same as a second focus evaluating value, a circuit for detecting a true focus evaluating value to supply the same based on at least one of the first and second focus evaluating values, a relative ratio calculating circuit for calculating a relative ratio of the first and second focus evaluating values, an in-focus state control circuit for carrying out an automatic focusing operation for controlling the relative position changing apparatus based on the true focus evaluating value so as to fix the relative position of the focusing lens to a position where the true focus evaluating value reaches the maximum value, and a circuit for comparing the relative ratio with a reference value to allow resumption of the automatic focusing operation by the in-focus state control circuit only when the relative ratio is the reference value or less after the relative position of the focusing lens is fixed once to a position where the focus evaluating value reaches the maximum value.

In accordance with another aspect of the present invention, an image sensing apparatus for automatically matching the focus relative to an object comprises an image sensing circuit having a focusing lens and an image sensor for generating a video signal in response to light incident from the object, a relative position changing apparatus for changing a relative position in the direction of an optical axis of the focusing lens relative to the image sensor, a first focus evaluating value detecting circuit for detecting every constant time period a level of a first high frequency component in the video signal to supply the same as a first focus evaluating value, a second focus evaluating value detecting circuit for detecting every constant time period a level of a second high frequency component including a component at a frequency which is lower than the frequency of the first high frequency component in the video signal to supply the same as a second focus evaluating value, a circuit for detecting a true focus evaluating value to supply the same based on at least one of the first and second focus evaluating values, a relative ratio calculating circuit for calculating a relative ratio of the first and second focus evaluating values, an in-focus state control circuit for carrying out an automatic focusing operation for controlling the relative position changing apparatus based on the true focus evaluating value so as to fix the relative position of the focusing lens to a position where the true focus evaluating value reaches the maximum value, and a circuit for comparing the relative ratio with a reference value and controlling the relative position changing apparatus so as not to fix the relative position of the focusing lens when the relative ratio does not reach the reference value even if the true focus evaluating value reaches a maximum value.

According to still another aspect of the present invention, an image sensing apparatus for automatically matching the focus relative to an object comprises an image sensing circuit having a focusing lens and an image sensor for generating a video signal in response to light incident from the object, a relative position changing apparatus for changing a relative position in the direction of an optical axis of the focusing lens relative to the image sensor, a first focus evaluating value detecting circuit for detecting every constant time period a level of a first high frequency component in the video signal to supply the same as a first focus evaluating value, a second focus evaluating value detecting circuit for detecting every constant time period a level of a second high frequency component including a component at a frequency which is lower than the frequency of the first high frequency component in the video signal to supply the same as a second focus evaluating, a circuit for detecting a true focus evaluating value to supply the same based on at least one of the first and second focus evaluating values, a relative ratio calculating circuit for calculating a relative ratio of the first and second focus evaluating values, an in-focus state control circuit for carrying out an automatic focusing operation for controlling the relative position changing apparatus based on the true focus evaluating value so as to fix the relative position of the focusing lens to a position where the true focus evaluating value reaches the maximum value, a circuit for carrying out an object change confirming operation for confirming the presence or absence of the change of the object by changing the relative position of the focusing lens by a variable small amount of change a plurality of times after the relative position of the focusing lens is fixed once to a position where the true focus evaluating value reaches the maximum value, and a circuit for comparing the relative ratio with a reference value to decrease the variable small amount of change in the object change confirming operation when the relative ratio is larger than the reference level, as compared with a case in which the relative ratio is smaller than the reference value.

In accordance with a further aspect of the present invention, an image sensing apparatus for automatically matching the focus relative to an object comprises an image sensing circuit having a focusing lens and an image sensor for generating a video signal in response to light incident from the object, a relative position changing apparatus for changing a relative position in the direction of an optical axis of the focusing lens relative to the image sensor, a first focus evaluating value detecting circuit for detecting every constant time period a level of a first high frequency component in the video signal to supply the same as a first focus evaluating value, a second focus evaluating value detecting circuit for detecting every constant time period a level of a second high frequency component including a component at a frequency which is lower than the frequency of the first high frequency component in the video signal to supply the same as a second focus evaluating value, a circuit for detecting a true focus evaluating value to supply the same based on at least one of the first and second focus evaluating values, a relative ratio calculating circuit for calculating a relative ratio of the first and second focus evaluating values, a circuit for controlling the relative position changing apparatus based on the true evaluating value so as to drive the relative position of the focusing lens to a position where the true focus evaluating value reaches the maximum value, an increase or decrease determining circuit for determining whether the relative ratio tends to be increased or decreased, and a circuit for controlling the relative position changing apparatus so as to to reverse the direction of movement of the relative position of the focusing lens when the increase or decrease determining circuit determines that the relative ratio tends to be decreased while the relative position of the focusing lens is moved in one direction by the control circuit.

In accordance with a still further aspect of the present invention, an image sensing apparatus for automatically matching the focus relative to an object comprises an image sensing circuit having a focusing lens and an image sensor for generating a video signal in response to light incident from the object, a relative position changing apparatus for changing a relative position in the direction of an optical axis of the focusing lens relative to the image sensor, a first focus evaluating value detecting circuit for detecting every constant time period a level of a first high frequency component in the video signal to supply the same as a first focus evaluating value, a second focus evaluating value detecting circuit for detecting every constant time period a level of a second high frequency component including a component at a frequency which is lower than the frequency of the first high frequency component in the video signal to supply the same as a second focus evaluating value, a circuit for detecting a true focus evaluating value to supply the same based on at least one of the first and second focus evaluating values, a relative ratio calculating circuit for calculating a relative ratio of the first and second focus evaluating values, a circuit for controlling the relative position changing apparatus based on the true focus evaluating value so as to drive the relative position of the focusing lens to a position where the true focus evaluating value reaches the maximum value, an increase or decrease determining circuit for determining whether the relative ratio tends to be increased or decreased, and a circuit for controlling the relative position changing apparatus so as to prevent the direction of movement of the relative position of the focusing lens from being reversed when the increase or decrease determining circuit determines that the relative ratio tends to be increased while the relative position of the focusing lens is moved in one direction by the control circuit.

Accordingly, a principal advantage of the present invention is that considering a case in which a focus evaluating value does not change although the distance from a lens to an object is changed after the object is bought into focus, when a relative ratio of focus evaluating values obtained in response to outputs of two types of filters having different cut-off frequencies is below a reference value, an in-focus operation can be resumed.

Another advantage of the present invention is that considering a case in which a focus evaluating value changes although the distance from a lens to an object is not changed after the object is brought into focus, so long as a relative ratio of focus evaluating values is not below a reference value, it is determined that the distance from the lens to the object is not changed, so that an automatic focusing operation is not unnecessary resumed.

Still another advantage of the present invention is that when a relative ratio does not reach a reference value even if a focus evaluating value reaches a maximum during an automatic focusing operation, the focus evaluating value is judged to be a false maximal point, so that an in-focus state is not terminated in a defocused state.

A further advantage of the present invention is that when a relative ratio is larger than a reference value in an object change confirming operation after an object is brought into focus, it is determined that there is high possibility that the distance between a focusing lens and the object is not changed, to select a smaller value as a very small amount of movement of a relative position of the focusing lens for the confirming operation, so that an unclear picture due to an unnecessary operation of the focusing lens can be prevented.

A still further advantage of the present invention is that it can be precisely determined whether or not a relative position of a focusing lens is toward an in-focus direction, so that a focusing lens can be prevented from moving in an erroneous direction.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
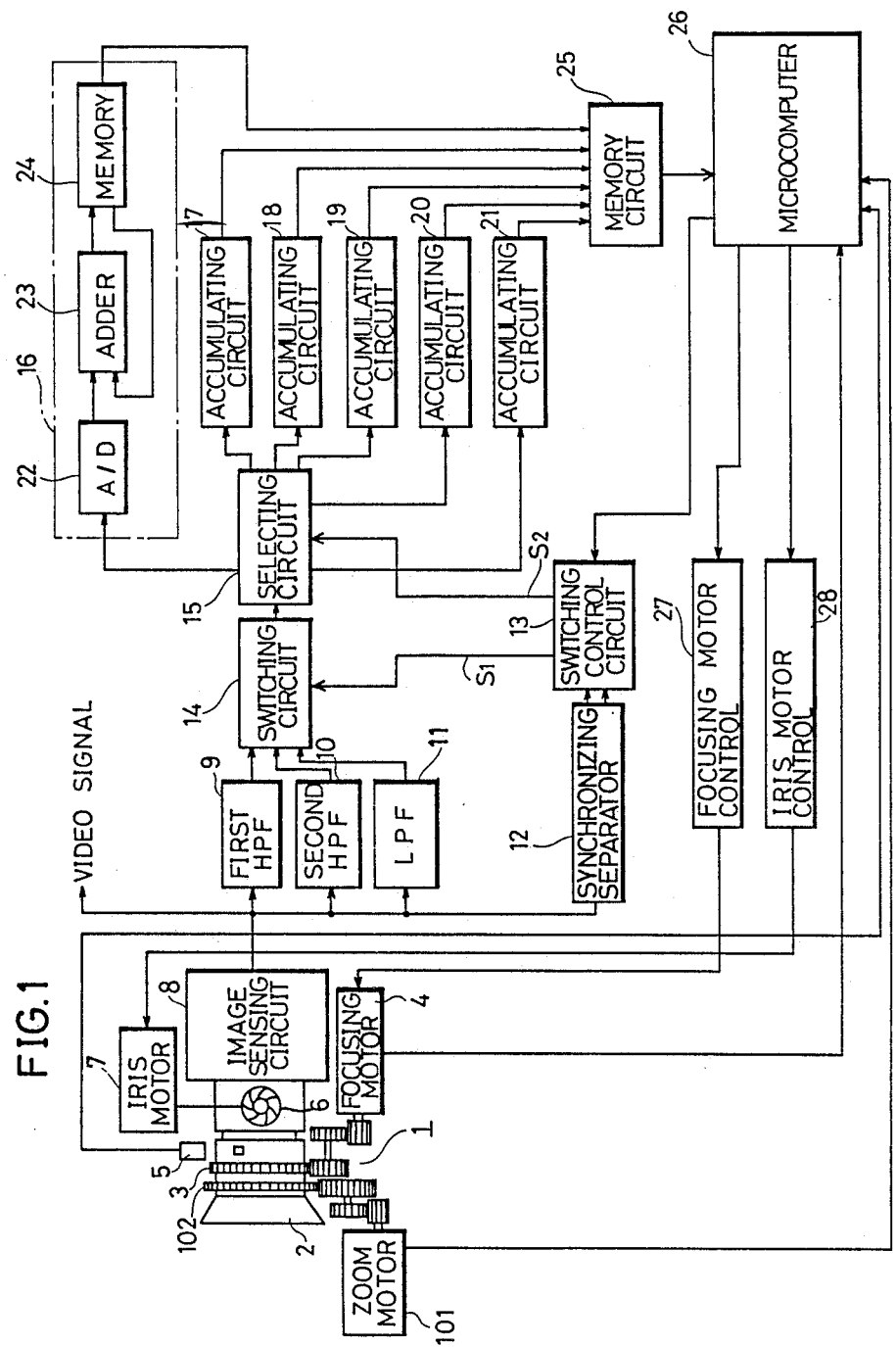
FIG. 1 is a schematic block diagram showing an automatic focusing/automatic iris apparatus according to an embodiment of the present invention.

FIG. 1 is a schematic block diagram showing an automatic focusing/automatic iris apparatus according to an embodiment of the present invention. In FIG. 1, a video camera portion 1 comprises a focusing lens 2, a focusing ring 3 for supporting this focusing lens 2 and moving the same in the direction of an optical axis, a focusing motor 4 for driving this focusing ring 3, an endpoint switch 5 for detecting the limit of a range in which the focusing ring 3 can be driven, a stop-down mechanism 6 for controlling exposure, an iris motor 7 for driving this stop-down mechanism 6, and an image sensing circuit 8 having a solid-state image sensor for converting light incident from an object into a video signal.

A luminance signal in the video signal obtained from the image sensing circuit 8 is applied to a first high-pass filter (HPF) 9 and a second HPF 10 having different cut-off frequencies, a low-pass filter (LPF) 11, and a synchronizing separator circuit 12.

Figure 2:
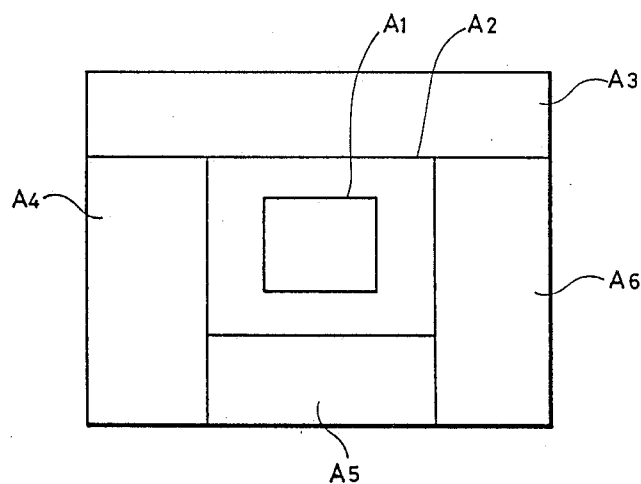
FIG. 2 is a diagram typically showing a manner in which sampling areas are set on an image sensed picture.

A vertical synchronizing signal VD and a horizontal synchronizing signal HD separated from the luminance signal by the synchronizing separator circuit 12 are supplied to a switching control circuit 13 for setting a sampling area. This switching control circuit 13 is responsive to the vertical and horizontal synchronizing signals VD and HD and a fixed output of an oscillator (not shown) serving as a clock for driving a CCD for outputting a selection signal S2 to apply the same to a selecting circuit 15 in the succeeding stage so as to set a rectangular first sampling area A1 in the center of a picture, a second sampling area A2 including this area A1 and having an area which is four times that of the area A1, and third to sixth sampling areas A3, A4, A5 and A6 around this area A2, as shown in FIG. 2. In addition, the switching control circuit 13 outputs a switching signal S1 for alternately selecting for each field outputs of the first HPF 9 and the second HPF 10 and selecting an output of the LPF 11 once per 32 fields to apply the same to a switching circuit 14.

As a result, the switching circuit 14 alternately selects the outputs of the first HPF 9 and the second HPF 10 for each field to output the same to the selecting circuit 15 in the succeeding stage and further selects the output of the LPF 11 only once per 32 fields to apply the same to the selecting circuit 15, in response to the switching signal S1.

On the other hand, the selecting circuit 15 is responsive to the selection signal S2 from the switching control circuit 13 for selectively applying the output selected by the switching circuit 14 to accumulating circuits 16, 17, . . . , 21 corresponding to sampling areas. More specifically, an output of each of the filters with respect to the first sampling area A1 and an output of each of the filters with respect to the second sampling area A2 are respectively applied to the accumulating circuits 16 and 17. Similarly, outputs of the respective filters with respect to the third to sixth sampling areas A3, A4, A5 and A6 are respectively applied to the accumulating circuits 18, 19, 20 and 21.

The accumulating circuit 16 comprises an A/D converter 22, an adder 23, and a memory circuit 24. The A/D converter 22 sequentially A/D converts the filter outputs passing through the selecting circuit 15, to apply the same to the adder 23. The adder 23, together with the A/D converter 22 in the preceding stage and the memory circuit 24 in the succeeding stage, constitutes a digital integrator, which adds an output of the memory circuit 24 to an output of the A/D converter 22 to supply the result of the addition to the memory circuit 24. The memory circuit 24 is reset for each field. Thus, the memory circuit 24 holds an output of the adder 23, i.e., a digitally converted value, corresponding to one field, of a level of a luminance signal passing through a filter selected in the current field with respect to the first sampling area A1.

The accumulating circuits 17, 18, . . . , 21 have all the same structures as that of the accumulating circuit 16. Thus, a memory circuit contained in each of the accumulating circuits holds an integrated value, corresponding to one field, of a level of a luminance signal passing through a filter selected in the current field with respect to each of the sampling areas. The integrated value in each of the memory circuits is further applied to the memory circuit 25 in the succeeding stage, to be collectively stored therein.

Areas where passage through the first HPF 9, the second HPF 10 and the LPF 11 is allowed are respectively set to 600 KHz or more, 200 KHz or more and 2.4 MHz or less. In practice, the areas can be respectively set using BPFs respectively having pass bands of 600 KHz to 2.4 MHz, 200 KHz to 2.4 MHz, and 0 to 2.4 MHz. 2.4 MHz is a substantially high frequency independent of a luminance signal and thus, the LPF 11 can be omitted. Thus, a high frequency component or a low frequency component, corresponding to one field, of a luminance signal passing through any one of the first HPF 9, the second HPF 10 and the LPF 11 is digitally integrated, the integrated value being stored in a memory circuit 25 as an evaluating value in the current field for each sampling area. An integrated value of a low frequency component in a field where the LPF 11 is selected and an integrated value of a high frequency component in a field where the first HPF 9 or the second HPF 10 is selected out of the integrated values stored in the memory circuit 25 are respectively operated by a microcomputer 26 in the succeeding stage as an exposure evaluating value for exposure control and a focus evaluating value for focus control.

The evaluating values are processed by the microcomputer 26 in a software manner. Based on the result of this processing, the microcomputer 26 carries out an automatic focusing operation such that the focus evaluating value reaches a maximum by issuing a command to a focusing motor control circuit 27, thereby to drive the focusing motor 4 to move the focusing lens 2. In addition, the microcomputer 26 carries out automatic exposure control such that the exposure evaluating values becomes a predetermined value by also issuing a command to an iris motor control circuit 28, thereby to drive the iris motor 7 to operate the stop-down mechanism 6.

Figure 3:
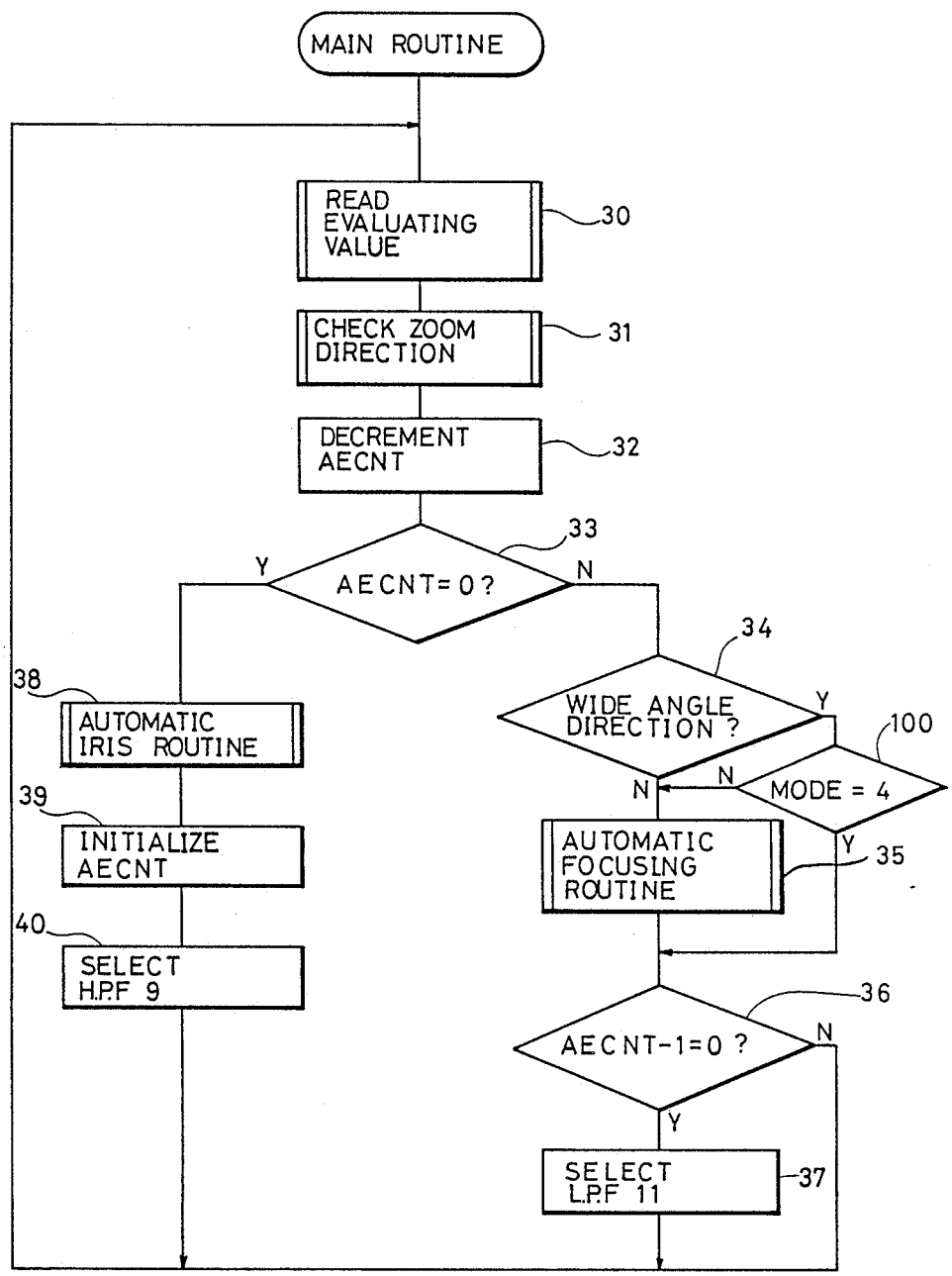
FIG. 3 is a flow chart showing a main routine of an automatic focusing/automatic iris operation.

Referring now to a flowchart of FIG. 3, description is made of a main routine of an automatic focusing operation and an automatic iris (automatic exposure control) operation by the microcomputer 26.

When a video camera enters an operating state, the microcomputer 26 first executes a main routine shown in FIG. 3.

First, in the step 30, an integrated value corresponding to the current one field with respect to each sampling area is read in the microcomputer 26 from the memory circuit 25. Then, in the step 31, the rotational direction of a zoom motor 101 (see FIG. 1) is detected. In this case, the zoom motor 101 drives rotation of a zoom ring 102 rotatably arranged in a lens barrel portion projected forward from a main body of the video camera 1 in a radial direction. This zoom ring 102 supports a zoom lens (not shown) which is a variable power lens. This zoom lens moves in the direction of an optical axis according to rotation of the zoom ring 102, which is movable from a telescope (Tele) region to a wide angle (Wide) region through a middle region. In general, a user can obtain a desired zoom position by operating a zoom driving switch (not shown) arranged in the main body of the camera to a telescope direction or a wide angle direction to rotate the zoom motor 101 in either direction.

Then, a count value of a counter AECNT provided for performing an automatic focusing operation and an automatic iris operation in a time divisional manner is decremented, that is, one is subtracted therefrom (in the step 32), to determine whether or not the count value is zero (in the step 33). The automatic focusing operation is carried out if the count value is not zero, while the automatic iris operation is carried out only when the count value is zero. In addition, if and when it is confirmed in the step 34 that result of the detection of the rotational direction of the zoom motor 101 i.e., a zoom direction in the step 31 is a wide angle direction and it is further determined in the step 100 that a code indicating an operation mode for automatic focusing as described below is "4", that is, the usual automatic focusing operation has been already completed so that the focusing lens reaches once a peak of the focus evaluating value, an automatic focusing routine (in the step 35) for carrying out an automatic focusing basic operation is not executed, to be skipped. The reason is as follows: when a zoom mechanism moves toward a wide angle side, the depth of field gradually becomes larger. Thus, if an in-focus state is achieved once before a zooming operation, the automatic focusing operation need not be carried out again during the zooming operation in a wide angle direction. In addition, if the automatic focusing operation is carried out in such a case, an unnecessary automatic focusing operation is repeated due to fluctuations in the focus evaluating value caused by the change in the angle of field, resulting in an unclear picture. Thus, the unclear picture must be prevented. If and when the zoom direction is not the wide angle direction, or the zoom direction is the wide angle direction but the in-focus state is not achieved immediately before the zooming operation, the automatic focusing routine (in the step 35) is executed.

When the automatic focusing routine is terminated, it is determined whether or not the result obtained by subtracting one from the content of the counter AECNT is zero (in the step 36). If the count value is zero, a control signal is generated to the switching control circuit 13 from the microcomputer 26, and the switching control circuit 13 applies the switching signal S1 for selecting the output of the LPF 11 to the switching circuit 14 upon receipt of the control signal, so that the output of the LPF 11 is selected (in the step 37).

Consequently, when the output of the LPF 11 is selected, the microcomputer 26 waits until an evaluating value obtained corresponding to this selected output of the LPF 11 is read in the memory circuit 25.

On the other hand, when the automatic iris operation is selected in the step 33, an automatic iris routine (in the step 38) which is the basis of the automatic iris operation is executed. Thereafter, the counter AECNT is returned to an initial state (in the step 39) and the output of the first HPF 9 is further selected (in the step 40), so that the microcomputer 26 waits for accumulation of evaluating values in the next field.

The initial state of the counter AECNT is a state in which an initial value "32" is set so as to calculate an exposure evaluating value in response to the luminance signal passing through the LPF 11 for one field every 32 fields.

Figure 4:
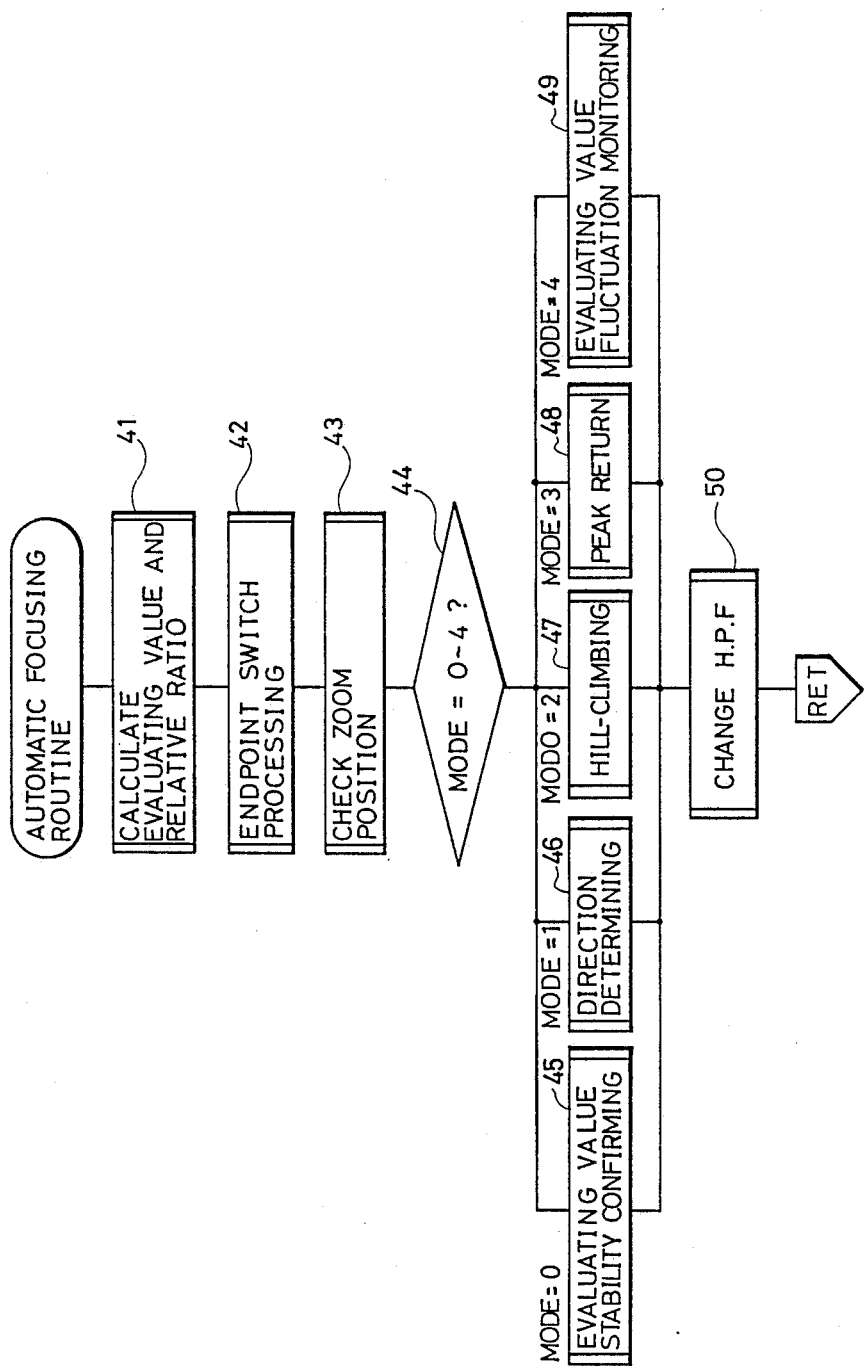
FIG. 4 is a flow chart showing a routine of the automatic focusing operation.

Referring now to a flowchart of FIG. 4, description is made of the automatic focusing operation according to the present invention.

If the automatic focusing operation is selected in the step 33 in the main routine shown in FIG. 3 and the zoom mechanism is not moved to the wide angle side (in the step 34), the automatic focusing routine (in the step 35) is executed.

First, in the step 41 shown in FIG. 4, focus evaluating values and a relative ratio thereof are calculated based on integrated values corresponding to sampling areas stored in the memory circuit 25. Then, confirming processing of an endpoint switch of the focusing ring is performed in the step 42 and then, a zoom position which is a zoom region of a zoom mechanism is confirmed in the step 43. Thereafter, a so-called hill-climbing control is started.

The hill-climbing control comprises a total of five routines: an evaluating value stability confirming routine (in the step 45), direction determining routine (in the step 46), a hill-climbing routine (in the step 47), a peak return routine (in the step 48) and an evaluating value fluctuation monitoring routine (in the step 49). Selection among the routines is made by designating any one of operation mode codes 0 to 4 in the step 44 according to conditions set in the previous field. In general, the evaluating value stability confirming routine (in the step 45), the direction determining routine (in the step 46), the hill-climbing routine (in the step 47), the peak return routine (in the step 48) and the evaluating value fluctuation monitoring routine (in the step 49) are executed in that order.

After each of the routines is terminated, the outputs of the high-pass filters are switched in the step 50. More specifically, when the automatic focusing routine in the current field is executed in response to the output of the first HPF 9 by the switching circuit 14, the output of the second HPF 10 is selected before the next field. In the contrary case, the microcomputer 26 applies a control signal to the switching control circuit 13 so as to achieve switching from the output of the second HPF 10 to the output of the first HPF 9. Thus, while the automatic focusing routine 35 is selected in the steps 33 and 34 in the main routine, the outputs of the first HPF 9 and the second HPF 10 are alternately selected for each field.

Figure 5:
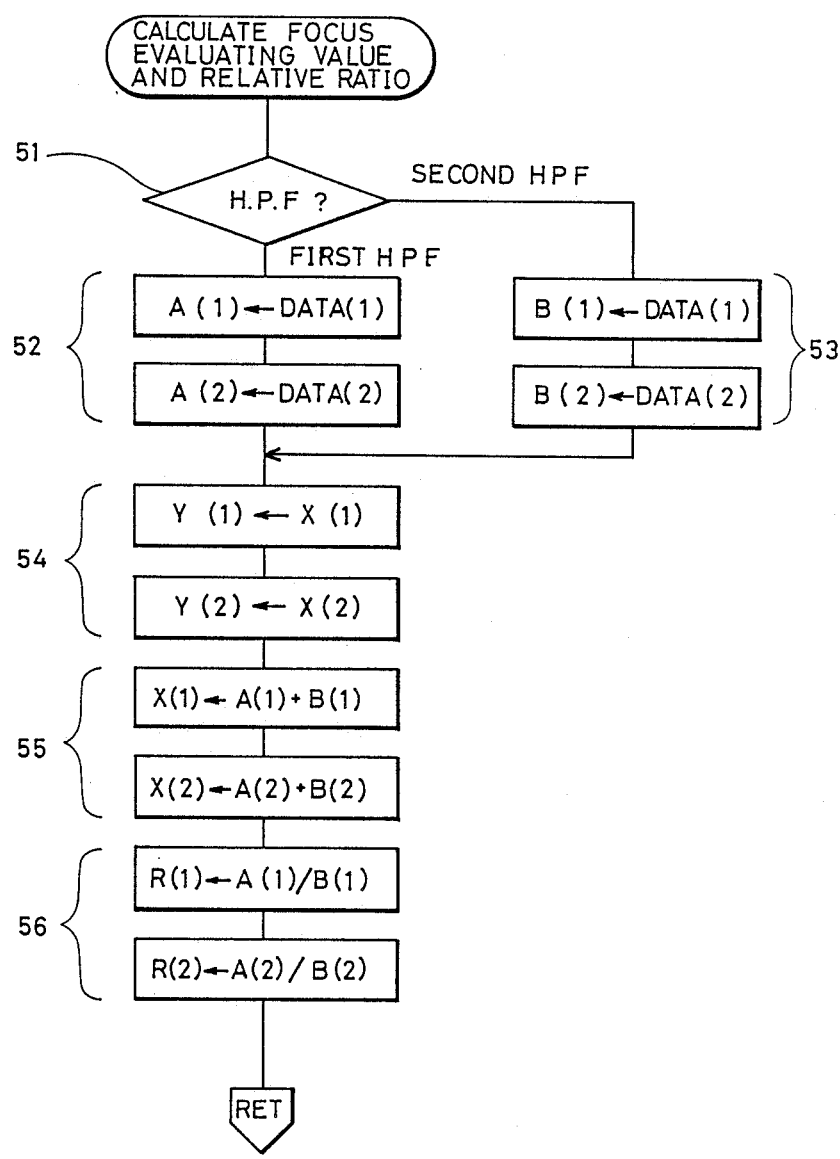
FIG. 5 is a flow chart showing a routine of calculating focus evaluating values and a relative ratio thereof.

Operations carried out in the automatic focusing routine shown in FIG. 4 will be individually described. Referring to a flowchart of FIG. 5, description is made of a calculating operation of focus evaluating values and a relative ratio thereof in the step 41.

First, it is determined in the step 51 which of outputs of the first HPF 9 and the second HPF 10 is used for extracting integrated values integrated by the accumulating circuits 16 and 17, i.e., integrated values DATA (1) and DATA (2) in the first and second sampling areas A1 and A2 out of integrated values held in the memory circuit 25 in the current field. The DATA (1) and the DATA (2) are respectively substituted in memories A(1) and A(2) (in the step 52) if it is determined that the output of the first HPF 9 is used while being respectively substituted in memories B(1) and B(2) (in the step 53) if it is determined that the output of the second HPF 10 is used. However, as described above, the second sampling area A2 is a region having an area which is four times that of the first sampling area A1 and including the first sampling area A1.

Then, in the step 54, focus evaluating values in first and second sampling areas A1 and A2 in the previous field are respectively transferred to memories Y(1) and Y(2).

In the step 55, focus evaluating values X(1) and X(2) in the first and second sampling areas A1 and A2 in the current field are calculated based on data in the memories A(1), A(2), B(1), and B(2). In this case, the focus evaluating value X(1) in the first sampling area A1 becomes the sum of values of the memories A(1) and A(2), i.e., the sum obtained by adding the newest accumulated value taken when the output of the first HPF 9 is used in the first sampling area A1 to the newest accumulated value taken when the output of the second HPF 10 is used. Similarly, the focus evaluating value X(2) becomes the sum of the values of the memories A(2) and B(2).

Figure 6:
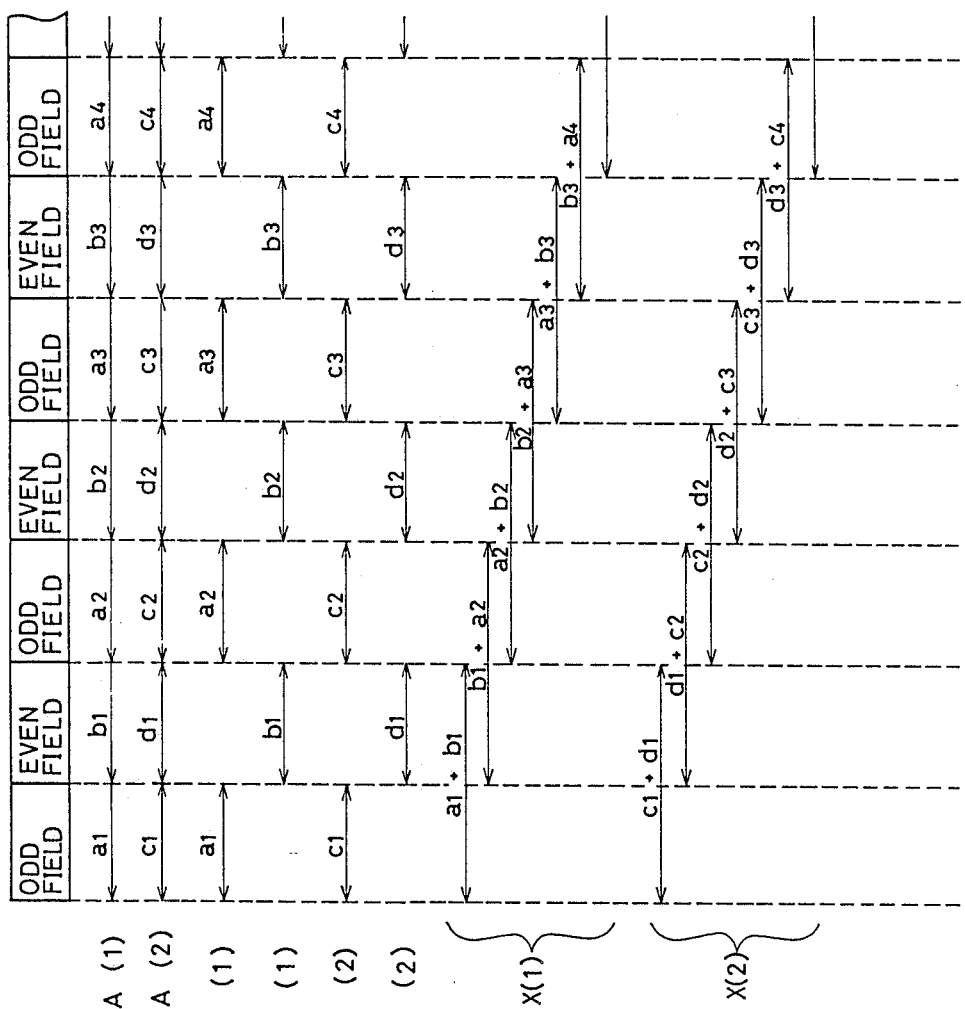
FIG. 6 is a diagram for typically explaining a manner in which the focus evaluating values and the relative ratio thereof are calculated.

For example, as shown in FIG. 6, it is assumed that a1, b1, a2, b2, ... are accepted in a memory for each field as the data DATA (1), and c1, d1, c2, d2, ... are accepted in a memory as the data DATA (2), where a1, a2, a3, ... are integrated values in the first sampling area A1 extracted using the output of the first HPF 9, b1, b2, b3, ... are integrated values in the first sampling area A1 extracted using the output of the second HPF 10, c1, c2, c3, ... are integrated values in the second sampling area A2 extracted using the output of the first HPF 9, and d1, d2, d3, ... are integrated values in the second sampling area A2 extracted using the output of the second HPF 10. As a result, the focus evaluating value X(1) sequentially varies for each field such as a1+b1, b1+a2, a2+b2, b2+a3, ..., and the focus evaluating value X(2) sequentially varies for each field such as c1+d1, d1+c2, c2+d2, d2+c3, .... Thus, the focus evaluating value in each sampling area becomes the sum of an integrated value extracted using the output of either one of the HPFs in the current field and an integrated value extracted using the output of the other HPF in the previous field, so that integrated values in an odd field and an even field are included in a single focus evaluating value. As a result, the variation in evaluating value for each field caused by interlacing or the like and the effect of noises on the evaluating values are mitigated, so that the automatic focusing operation is stabilized.

In the step 56, relative ratios R(1) and R(2) in the sampling areas are calculated. The relative ratio R(1) becomes A(1)/B(1) which is the ratio of the value of the memory A(1) to the value of the memory B(1), i.e., the ratio of the newest integrated value taken when the output of the first HPF 9 is used in the first sampling area A1 to the newest integrated value taken when the output of the second HPF 10 is used. Similarly, the relative ratio R(2) becomes A(2)/B(2) which is the ratio of the value of the memory A(2) to the value of the memory B(2).

An object of the endpoint switch processing routine (in the step 42) is to determine whether or not the focusing ring 3 reaches a near point or at ∞ point which is the limit of a rotatable range. More specifically, a reflecting plate on the side of the near point and a reflecting plate on the side of the ∞ point are respectively adhered to the focusing ring 3 such that the reflecting plates on the side of the near point and on the side of the ∞ point are opposed to the endpoint switch 5 fixed to a cabinet of a video camera when the focusing ring 3 reaches the near point or the ∞ point, to reflect light from a light emitting element in the endpoint switch 5 from each of the reflecting plates and receive the reflected light in the light receiving element in the endpoint switch 5, to determine whether each of the reflecting plates reaches a position opposed to the endpoint switch 5, i.e, the near point or the ∞ point. In addition, the near point and the ∞ point are distinguished based on the rotational direction of the focusing motor 4. Consequently, control is made such that the focusing motor 4 is reversed immediately after the focusing ring 3 reaches the near point or the ∞ point.

Description is now sequentially made of five routines which is the nucleus of the automatic focusing operation, i.e., the evaluating value stability confirming routine, the direction determining routine, the hill-climbing routine, the peak return routine and the evaluating value fluctuation monitoring routine.

Figure 7:
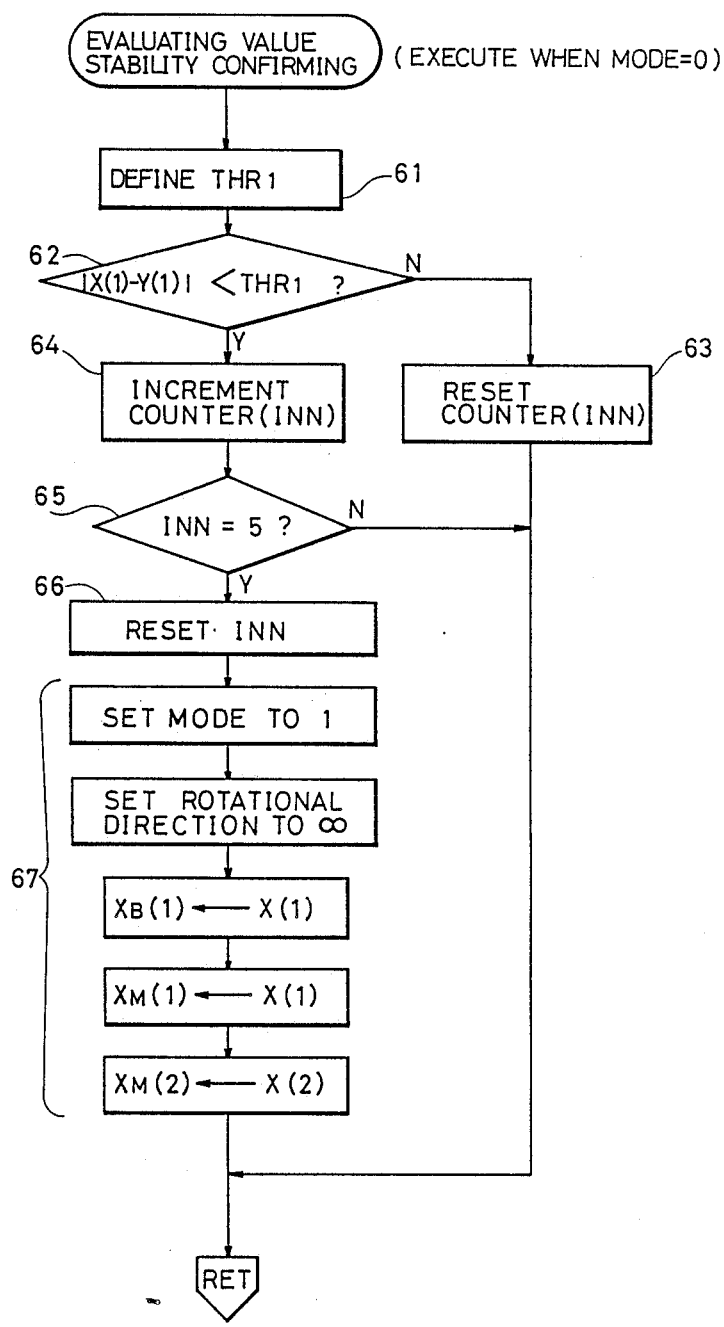
FIG. 7 is a flow chart showing an evaluating value stability confirming routine.

First, the evaluating value stability confirming routine is executed according to a flowchart of FIG. 7. This evaluating value stability confirming routine is executed when a power supply is turned on or an object changed to resume the automatic focusing operation, so that the operation mode code becomes "0".

First, in the step 61, a first threshold value THR1 is defined. Then, focus evaluating values X(1) and Y(1) in the current field and the previous field in the first sampling area A1 are compared with each other (in the step 62). When the difference therebetween is larger than the first threshold value THR1 first defined, it is considered that an evaluating value is not stable, so that a counter INN as described below is reset in the step 63. In order to execute this evaluating value stability confirming routine again when the automatic focusing routine is executed again in the next field, this routine is terminated with the operation mode code being "0".

On the other hand, when the difference between the focus evaluating values X(1) and Y(1) is the first threshold value THR1 or less, the counter INN is incremented in the step 64, that is, 1 is added to a count value thereof. In the step 65, it is determined whether or not the count value of the counter INN attains "5", that is, this state is continued over five fields. If the count value of the counter INN does not attain "5", the evaluating value stability confirming routine is terminated once. However, the operation mode code remains "0", so that this evaluating value stability confirming routine is executed again in the automatic focusing routine in the next field.

On the other hand, in the step 65, when it is determined that the state in which the difference between the focus evaluating values X(1) and Y(1) is smaller than the first threshold value THR 1 is continued over five fields, the counter INN is reset in the step 66, and the automatic focusing operation is initialized in the step 67.

More specifically, in the step 67, the operation mode code is changed to "1" so as to execute the direction determining routine in the automatic focusing routine in the next field, the rotational direction of the focusing motor 4 is initialized to the direction of the ∞ point, the focus evaluating value X(1) in the first sampling area A1 in the current field is stored as a reference evaluating value $X_B(1)$ and a first maximum evaluating value $X_M(1)$, and the focus evaluating value X(2) in the second sampling area A2 in the current field is stored as a second maximum evaluating value $X_M(2)$, to terminate the evaluating value stability confirming routine.

Figure 8:
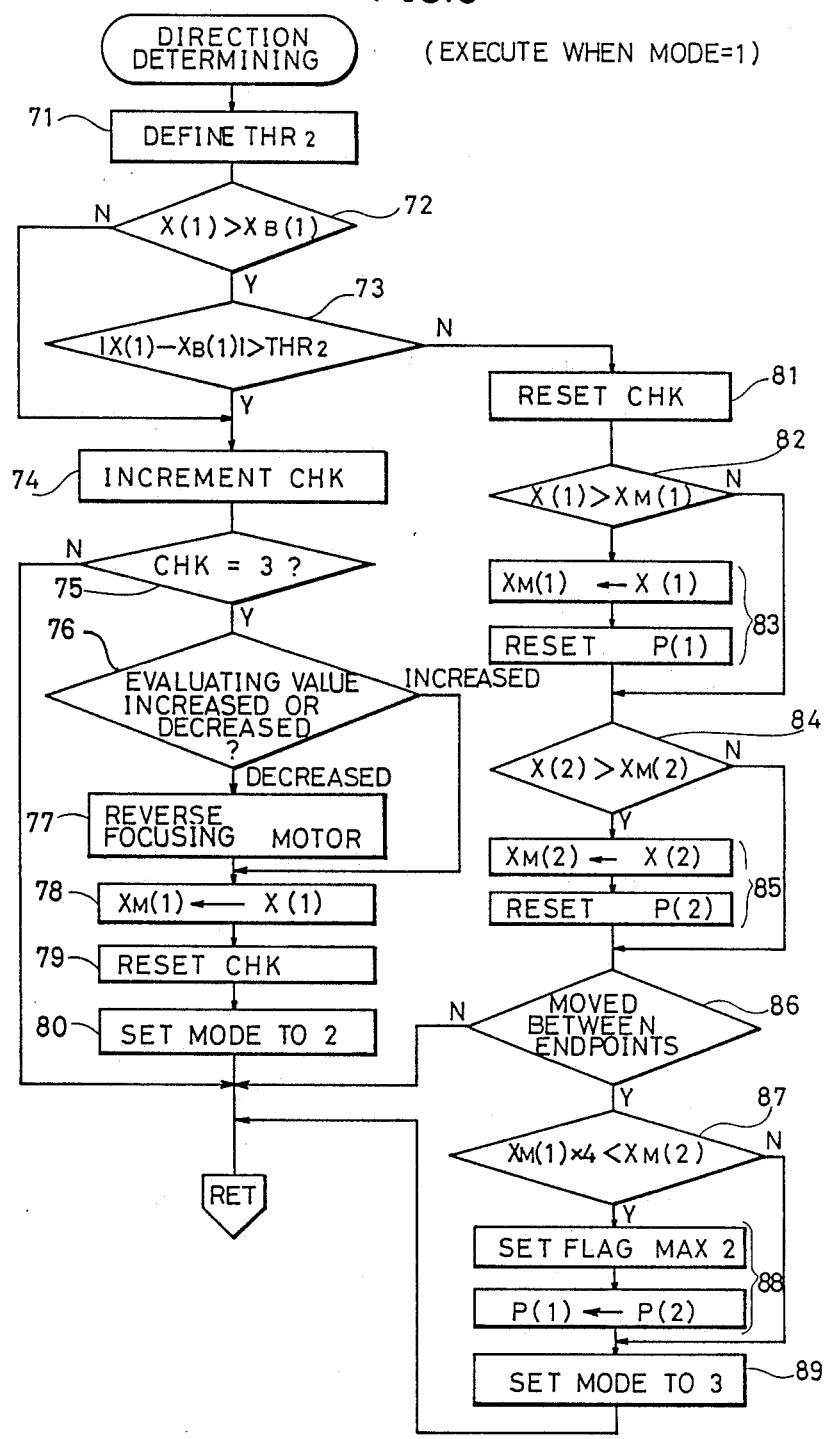
FIG. 8 is a flow chart showing a direction determining routine.

Referring now to FIG. 8, description is made of a subroutine for carrying out a direction determining operation. An object of the direction determining routine is to determine whether a peak of a focus evaluating value is in the direction of the near point or the ∞ point with respect to the current position of a lens.

First, in the step 71, a second threshold value THR 2 is defined in advance. It is determined that the peak which is the maximum value of the focus evaluating value exists on the side of the rotational direction of the focusing motor 4 if the focus evaluating value X(1) in the current field is larger than a reference evaluating value $X_B(1)$ defined by a focus evaluating value in the final field in the focus evaluating value stability confirming routine, while it is determined that the peak exists on the side of the reverse direction if the focus evaluating value X(1) is smaller than the reference evaluating value $X_B(1)$ (in the step 72). In practice, the above described determination is made only when it is confirmed that the difference between the focus evaluating value X(1) in the current field and the reference evaluating value $X_B(1)$ exceeds the second threshold value THR 2 set in advance in consideration of the variation in the focus evaluating value due to noises or the like (in the step 73).

Figure 9:
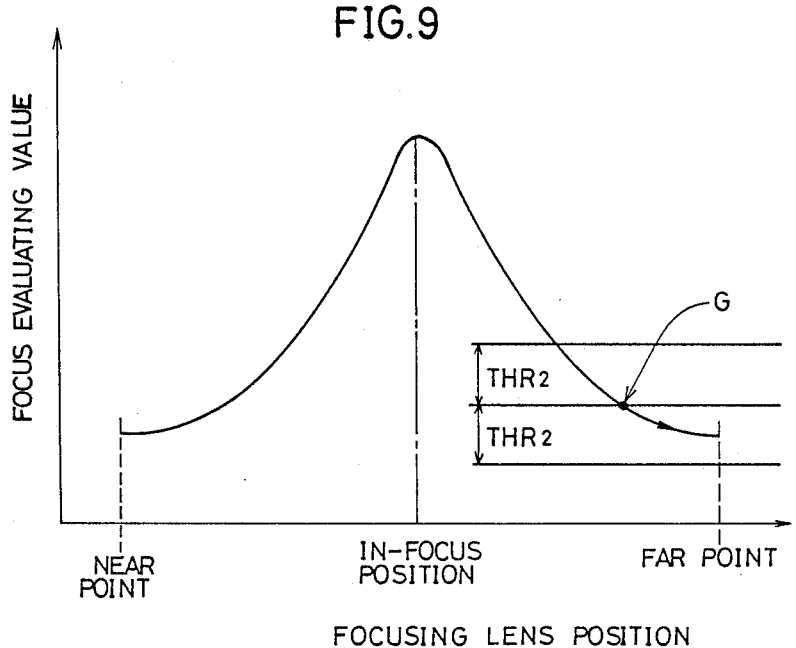
FIG. 9 is a graph showing the relation between the position of a focusing lens and a focus evaluating value.

Meanwhile, let's consider a case in which the direction determining routine is executed utilizing as the reference evaluating value $X_B(1)$ a focus evaluating value at G point where the focusing lens is greatly spaced apart from the in-focus position so that an object is significantly defocused, as shown in FIG. 9. More specifically, considering a case in which the focus evaluating value is small and the slope is not clear, if the focusing lens 2, i.e., the focusing ring 3 is moved in the direction of decreasing the focus evaluating value, the focusing lens 2 is moved to an endpoint (∞ point) without exceeding the second threshold value THR 2 as represented by an arrow in FIG. 9, creating the impression that a picture is unclear. Therefore, only when the focus evaluating value X(1) in the current field is larger than the reference evaluating value $X_B(1)$, the second threshold value THR is applied. On the other hand, when the focus evaluating value X(1) is smaller than the reference evaluating value $X_B(1)$, the step 73 is skipped over to the step 74, in which a counter CHK is incremented for each field. When a count value of the counter CHK becomes 3, that is, it is determined in the step 75 that a state in which the focus evaluating value X(1) is below the reference evaluating value $X_B(1)$ or is larger than the reference evaluating value $X_B(1)$ and the difference therebetween exceeds the second threshold value THR 2 is continued over three fields, it is determined in the step 76 whether or not focus evaluating values in three fields are all larger than the reference evaluating value $X_B(1)$. When it is determined that the focus evaluating values are all larger than the reference evaluating value $X_B(1)$, it is determined that the evaluating values tend to be increased. On the other hand, when the focus evaluating values are all smaller than the focus evaluating value $X_B(1)$, it is determined that the focus evaluating values tend to be decreased.

When the focus evaluating values tend to be increased, the rotational direction of the focusing motor 4 is maintained in the present condition. On the other hand, when the focus evaluating values tend to be decreased, the rotational direction of the focusing motor 4 is reversed in the step 77. In the steps 78 to 80, the focus evaluating value $X(1)$ in the current field is held as the maximum evaluating value $X_M(1)$, the counter CHK is reset, and the operation mode code is set to "2", thereby to execute the hill-climbing routine in the automatic focusing routine in the next field.

Additionally, when it has not been determined yet in the step 75 that the above described state is continued over three fields, the direction determining routine is terminated once with the rotational direction of the focusing motor 4 and the operation mode code being maintained in the present conditions, to execute the direction determining routine again in the automatic focusing routine in the next field.

On the other hand, it is determined in the step 73 that the difference between the focus evaluating value $X(1)$ and the reference evaluating value $X_B(1)$ does not exceed the second threshold value THR 2, the counter CHK is reset in the step 81, and it is determined in the step 82 whether or not the focus evaluating value $X(1)$ in the first sampling area A1 in the current field is larger than the maximum evaluating value $X_M(1)$ so far detected. If it is determined that the focus evaluating value $X(1)$ is larger than the maximum evaluating value $X_M(1)$, the maximum evaluating value $X_M(1)$ is updated by this focus evaluating value $X(1)$ and a first ring position counter $P(1)$ is reset so as to hold a mechanical position of the focusing ring 3 at the time of updating, in the step 83. In the step 84, it is determined whether or not the focus evaluating value $X(2)$ in the second sampling area A2 in the current field is larger than the maximum evaluating value $X_M(2)$ so far detected in the same area. If the focus evaluating value $X(2)$ is larger than the maximum evaluating value $X_M(2)$, the maximum evaluating value $X_M(2)$ is updated by this focus evaluating value $X(2)$ and a second ring position counter $P(2)$ is reset so as to hold the mechanical position of the focusing ring 3 at the time of updating, in the step 85. Assuming that a constant amount of rotation of the focusing motor 4 in a predetermined direction of rotation thereof is one step, both the counters $P(1)$ and $P(2)$ are adapted so as to be counted up every time the focusing motor 4 is driven by one step while being counted down every time the focusing motor 4 is driven by one step if the rotational direction thereof is reversed.

When it is determined in the step 86 that the focusing ring 3 is moved between both endpoints with the difference between the focus evaluating value $X(1)$ and the reference evaluating value $X_B(1)$ not exceeding the second threshold value THR 2 in the case that no object exists in the first and second sampling areas A1 and A2 or there exists an unclear object, if any, that is, a flag set by the endpoint switch 5 when the focusing lens 2 contacts with the near point while repeating the direction determining routine and a flag set by the endpoint switch 5 when the focusing lens 2 reaches the $\infty$ point are both set, the maximum evaluating values $X_M(1)$ and $X_M(2)$ in both the areas are compared with each other in the step 87. In making the comparison, the maximum evaluating value $X_M(1)$ is increased by four times in consideration of a 1:4 ratio of areas of the first and second sampling areas A1 and A2, to be normalized with respect to the maximum evaluating value $X_M(2)$. As a result of this above described comparison, when it is determined that the maximum evaluating value $X_M(2)$ is larger, a flag MAX2 used in the succeeding routine is set and a count value of the first ring position counter $P(1)$ is updated by a count value of the second ring position counter $P(2)$, in the step 88. The following automatic focusing operation is performed with respect to the second sampling area A2. In addition, when a value obtained by increasing the maximum evaluating values $X_M(1)$ by four times is larger, the automatic focusing operation is performed with respect to the first sampling area A1. The operation mode code is changed to "3" in the step 89, so that the return routine is executed in the automatic focusing routine in the next field. Furthermore, when it is not determined in the step 86 that the focusing ring 3 is entirely moved between the both endpoints, this direction determining routine is executed again in the automatic focusing routine in the next field.

Figure 10:
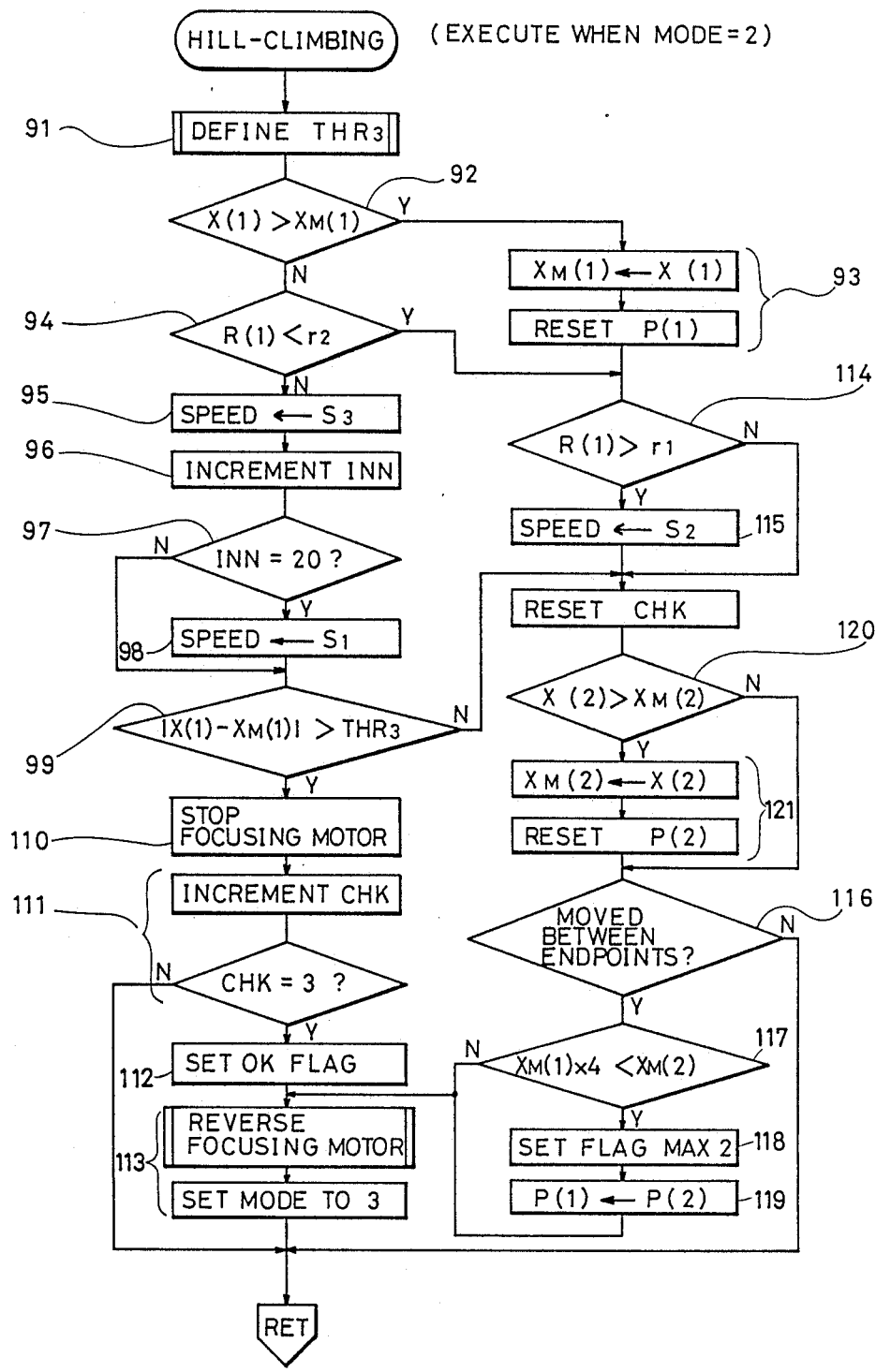
FIG. 10 is a flow chart showing a hill-climbing routine.

Referring now to a flowchart of FIG. 10, description is made of an operation of the hill-climbing routine. An object of the hill-climbing routine is to discover a peak where a focus evaluating value reaches a maximum.

First, in the step 91, a fixed value is defined in advance as a third threshold value THR 3, to continue to rotate the focusing motor 4, i.e, the focusing ring 3 at a first speed s1 in a direction determined by the above described direction determining routine. Every time it is determined in the step 92 that the focus evaluating value $X(1)$ in the current field exceeds the maximum evaluating value $X_M(1)$ so far detected, the maximum evaluating value $X_M(1)$ is updated by the focus evaluating value $X(1)$ and the first ring position counter $P(1)$ is further reset, in the step 93.

On the other hand, considering a case in which it is determined in the step 92 that the focus evaluating value $X(1)$ in the current field is not larger than the maximum evaluating value $X_M(1)$ so far detected, when it is determined in the step 99 through the above described steps 94 to 98 that the focus evaluating value $X(1)$ is below the maximum evaluating value $X_M(1)$ by the third threshold value THR 3 or more, the focusing motor 4 is immediately stopped in the step 110. When it is determined in the step 111 that this stat is continued with respect to focus evaluating values in successive three fields, a relative ratio OK flag is set in the step 112, and the rotational direction of the focusing motor 4 is reversed and the operation mode code is set to "3" in the step 113. Consequently, in the automatic focusing routine in the next field, the peak return routine is executed. A CHK in the step 111 is used for determining whether or not the state of $|X(1)-X_M(1)|>THR3$ is continued over three fields.

Figure 11:
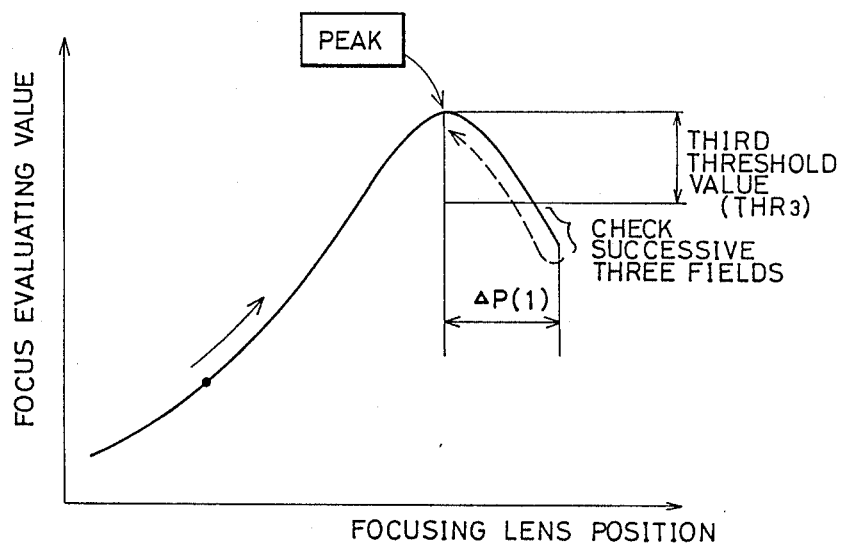
FIG. 11 is a graph showing the change of the focus evaluating value when the focusing lens is returned to a peak
Figure 12:
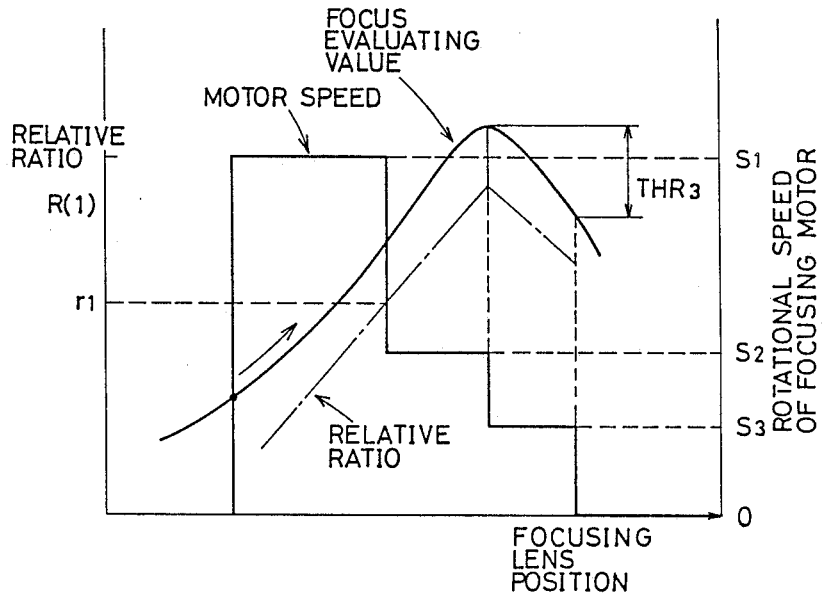
FIG. 12 is a graph showing the relation among the position of the focusing lens, the focus evaluating value, the rotational speed of a focusing motor, and the relative ratio of focus evaluating values.

Additionally, FIG. 11 is a graph showing the change in focus evaluating value to occur when the focusing lens is returned to a peak, and FIG. 12 is a graph showing a relation among the position of the focusing lens, a focus evaluating value, the rotational speed of the focusing motor, and a relative ratio of focus evaluating values. In FIG. 11, if an amount $P(1)$ of movement over the peak is too large, the degree of defocusing is increased, so that a picture becomes unclear. In order to make the amount P(1) as small as possible, the rotational speed of the focusing motor 4 is controlled as follows: First, a relative ratio R(1) is monitored for each field (in the step 114) during a hill-climbing operation. When the relative ratio R(1) exceeds a first reference relative ratio r1 as shown in FIG. 12, it is considered that the focusing lens is close to the peak, so that the rotational speed of the focusing motor 4 is reduced from a standard speed s1 so far to an intermediate speed s2 lower than the standard speed s1 in the step 115. Then, when the focus evaluating value X(1) is the maximum evaluating value $X_M(1)$ or less, the rotational speed of the focusing motor 4 is reduced to a speed s3 lower than the intermediate speed s2 in the step 95. Then, when it is determined in the step 99 that the difference between the focus evaluating value X(1) and the maximum evaluating value $X_M(1)$ exceeds the third threshold value THR 3, the focusing motor 4 is stopped (in the step 110), and it is confirmed that the difference between the focus evaluating value X(1) and the maximum evaluating value $X_M(1)$ is the third threshold value THR 3 or less over three fields (in the step 111).

However, when it is determined in the steps 96 and 97 that the above described hill-climbing operation is not completed after a lapse of 20 fields since the rotational speed of the focusing motor 4 was reduced to the speed s3, the rotational speed of the focusing motor 4 is returned to the standard speed s1 which is the highest speed in the step 98, to continue the hill-climbing operation. Consequently, the focusing motor 4 can be prevented from being operated for a long time with the speed thereof being reduced. In the steps 96 and 97, the counter INN, which is used for determining that the above described state is continued over 20 fields, is counted up for each field.

Furthermore, in the step 94, the relative ratio R(1) is checked at the time point when the focus evaluating value X(1) passes through the peak. When the relative ratio R(1) is too small as a relative ratio in the peak, that is, a second reference relative ratio r2 or less, the program proceeds to the step 114, to force the hill-climbing routine to be also executed in the next field. Only when the relative ratio R(1) at the peak is the second reference relative ratio R2 or more, the next peak return routine is started through the steps 95 to 113. Consequently, the frequency of a malfunction is decreased that the peak is erroneously recognized due to noises or the like so that the focusing lens 2 is stopped in a defocused state. In this case, the second reference relative ratio r2 is previously set as a relative ratio (for example, 0.1) at the time that the defocused state is considerably recognized.

Figure 13:
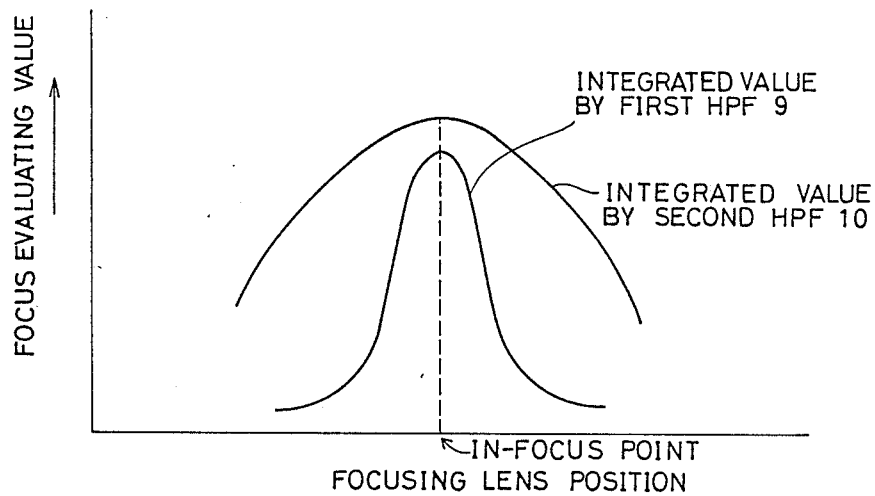
FIG. 13 is a graph showing the relation between the position of the focusing lens and an accumulated value of the outputs of high-pass filters.
Figure 14:
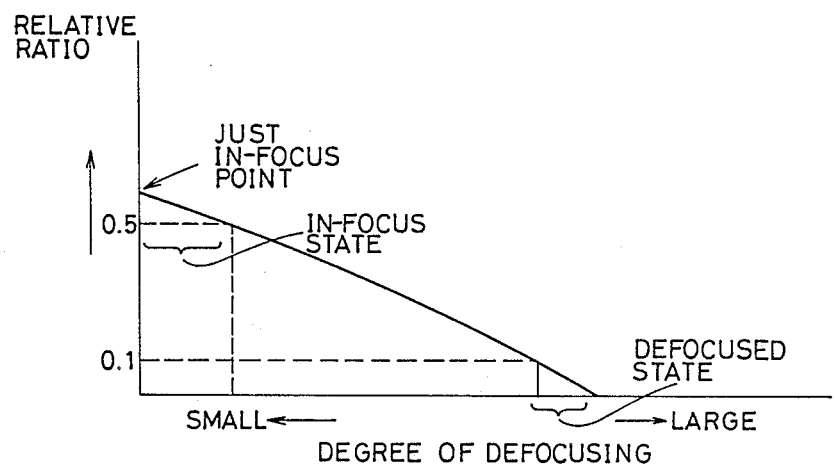
FIG. 14 is a graph showing the relation between the relative ratio of focus evaluating values and the degree of defocusing.

Meanwhile, description is now made in detail of the reason why the relation between the relative ratio R(1) and the position of the focusing ring is linearly changed as shown in FIG. 1. This relative ratio R(1) is a ratio of the integrated value corresponding to one field taken when the output of the first HPF in the first sampling area H is used as described above to the integrated value corresponding to one field taken when the output of the second HPF 10 therein is used. The relation between both the integrated values and the position of the focusing ring with respect to the same object is shown in FIG. 13. More specifically, the integrated value extracted using the output of the first HPF 9 having a higher cut-off frequency has a steep mountain-like shape, and the integrated value extracted using the output of the second HPF 10 having a lower cut-off frequency has a gentle mountain-like shape. When the relation between this relative ratio and the degree of defocusing of the object (that is, the amount of movement from the in-focus position or the amount of deviation) is graphically illustrated, a monotone decreasing characteristics curve as shown in FIG. 14 is obtained.

More specifically, this quantity of state which is this relative ratio is a function value by which the in-focus state of an object can be represented similarly to the focus evaluating value itself and is a kind of normalized quantity of state because it is represented by a ratio. Thus, the quantity of state has the property of not being affected by an environment where the object is placed. For example, when the illuminance of the object is changed, the absolute value of the focus evaluating value is changed. However, the relative ratio is not greatly changed. In general, the above described property is independent of the kind of object. Thus, this relative ratio can be utilized as a parameter indicating the degree of defocusing. When this monotone decreasing characteristic curve shown in FIG. 14 is expressed corresponding to the position of the focusing lens, a characteristic curve is obtained which almost linearly changes to the side of the near point and the side of the ∞ point with the in-focus position being a peak, at represented by a dot and dash line shown in FIG. 12.

Additionally, if and when also in this hill-climbing routine, it is determined in the step 116 that the focusing ring is moved between both the endpoints of the near point and the ∞ point with the difference between the focus evaluating value X (1) and the maximum evaluating value $X_M(1)$ not exceeding the third threshold value THR3, as in the above described direction determining routine, values per unit area of the maximum evaluating values $X_M(1)$ and $X_M(2)$ in the sampling areas A1 and A2, i.e., $X_M(1) \times 4$ and $X_M(2)$ are compared with each other in the step 117. If $X_M(1) \times 4$ is larger, the program proceeds to the step 113 in the present condition. Contrary to this, if $X_M(2)$ is larger, the flag MAX2 is set (in the step 118), the count value of the first ring position counter P(1) is updated by the count value of the second ring position counter P(2) (in the step 119), so that the program proceeds to the step 113. The second sampling area A2 is selected as a focusing area in the next peak return routine.

Meanwhile, if the focus evaluating value X (2) in the current field in the second sampling area A2 is larger than the maximum evaluating value $X_M (2)$ so far detected (in the step 120), the maximum evaluating value $X_M(2)$ is updated by this focus evaluating value X (2) and the second ring position counter P(2) is reset (in the step 121).

Figure 15:
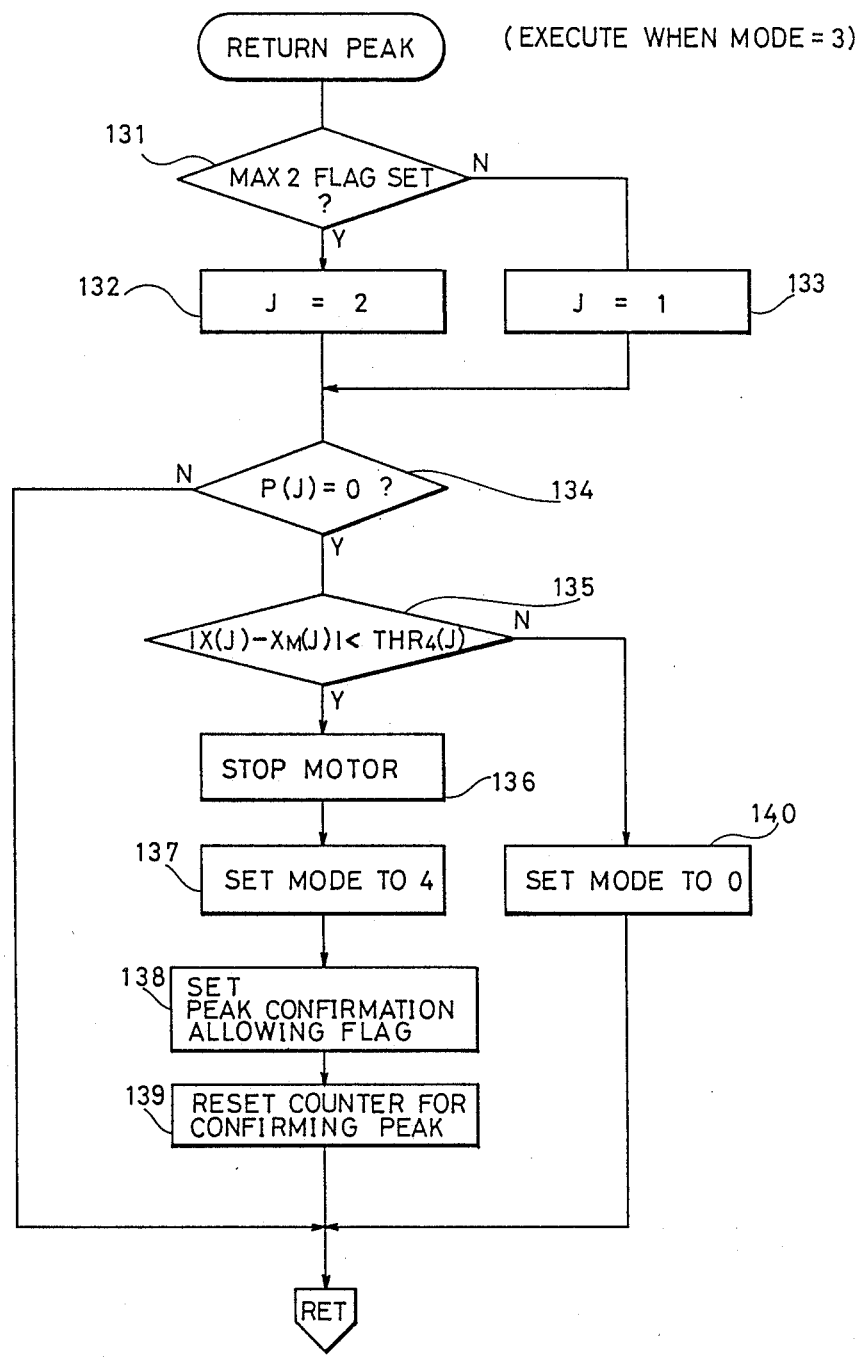
FIG. 15 is a flow chart showing a peak return routine.

Referring now to FIG. 15, description is made of an operation of the peak return routine for returning again the focusing ring 3 i.e., the focusing lens 2 to a peak position after recognizing the peak by the above described hill-climbing operation. The first ring position counter P (1) counted up for indicating the amount of movement over the peak in the hill-climbing routine or the first and second ring position counters P (1) and P (2) counted up when the focusing ring 3 is moved between both the endpoints in the direction determining routine or the hill-climbing routine is or are decremented by rotating the focusing ring 3 in the reverse direction in this peak return routine, that is, is counted down one at a time in response to rotation for each step of the focusing motor 4. When the count value of the ring position counter becomes zero, it is determined that the focusing lens 2 is returned to the peak position.

More specifically, in the step 131, it is determined whether or not the flag MAX2 is set in the above described hill-climbing routine or direction determining routine. The second sampling area A2 is designated as the subsequent focusing area in the step 132 if the flag MAX2 is in the set state, while the first sampling area A1 is designated as the subsequent focusing area in the step 133 if the flag MAX2 is not in the set state.

When it is determined in the step 134 that a count value of a ring position counter of a sampling area designated as a focusing area becomes zero, it is determined in the step 135 whether or not the difference between the focus evaluating value X (J) and a maximum evaluating value $X_M$ (J) in the sampling are selected as a focusing area is a previously set forth threshold value THR4 (J) or less. It is assumed that J=1 if the first sampling area A1 is designated as a focusing area, while J =2 if the second sampling area A2 is designated. When it is confirmed in the step 135 that the above described difference is the fourth threshold value THR4 or less, the focusing motor 4 is stopped in the step 136, and the operation mode code is set to "4" in the step 137 so as to execute the focus evaluating value fluctuation monitoring routine in automatic focusing routine in the next field. A peak confirmation allowing flag TL is set in the step 138, and a counter MC for confirming a peak is reset in the step 139, to terminate a series of auto-focus operations.

Additionally, when the difference between the focus evaluating value X (J) and the maximum evaluating value $X_M$ (J) is larger than the fourth threshold value THR4 (J), it is considered that the object is greatly displaced and the object itself is changed in a peak return operation, so that the operation mode code is set to "0" in the step 140, to resume the evaluating value stability confirming routine in the automatic focusing routine in the next field. It is assumed that an optimum value of the fourth threshold value THR4 (J) is individually set in advance corresponding to each sampling area.

Figure 16:
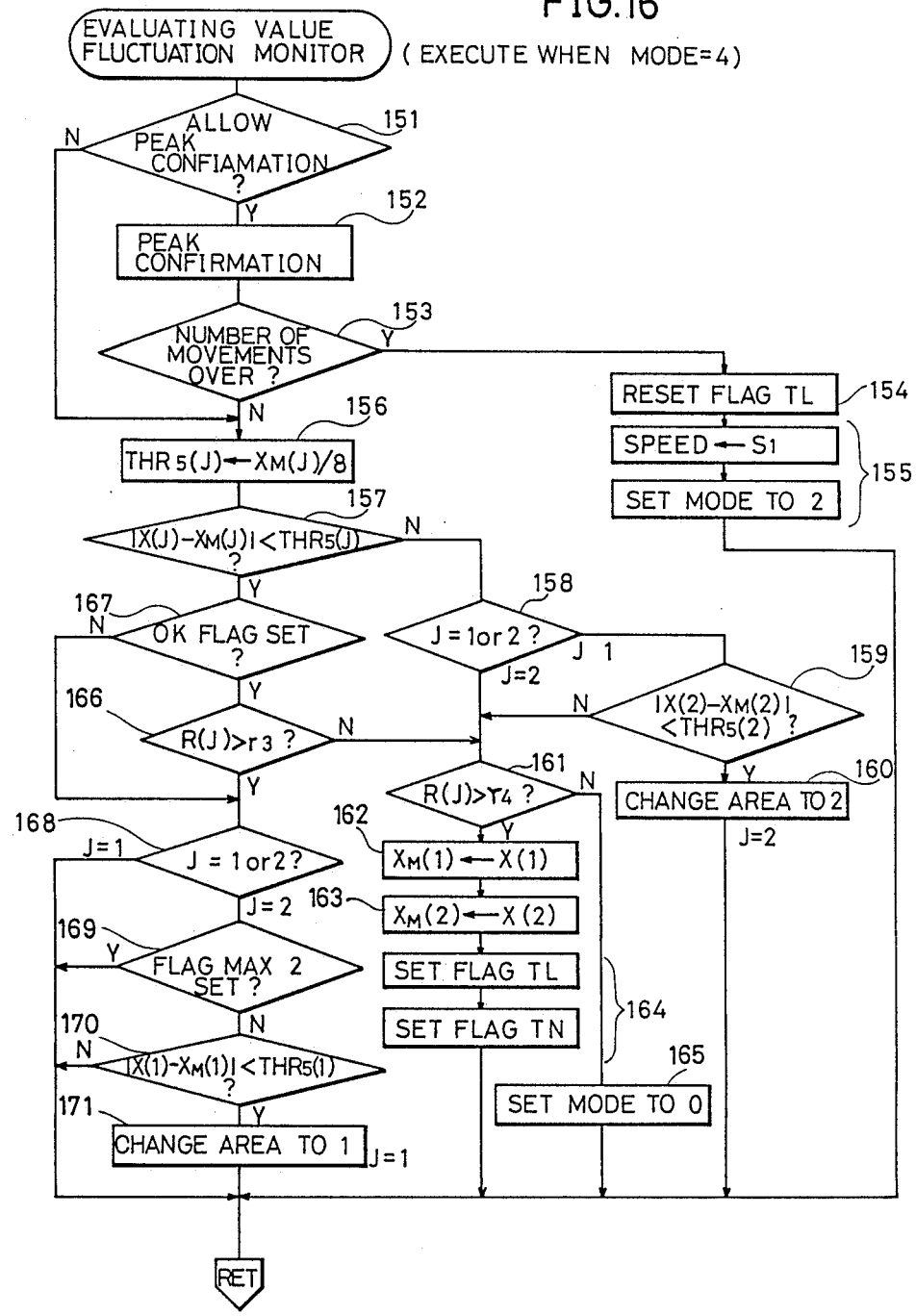
FIG. 16 is a flow chart showing a focus evaluating value fluctuation monitoring routine.

After the auto-focus operation is terminated, the focus evaluating value fluctuation monitoring routine is executed for monitoring the change of the object and determining whether or not the above described autofocus operation must be resumed when the object changed. Referring to a flow chart of FIG. 16, description is made of an operation of this focus evaluating value fluctuation monitoring routine.

First, in a field immediately after this focusing evaluating value fluctuation monitoring routine is started, the set state of the peak confirmation allowing flag TL set immediately before the peak return routine is terminated is determined in the step 151 in order to examine whether or not there is an error in the peak detected in the above described series of auto-focus operations. In the first field after the peak return routine, the flag TL is in the set state, so that the peak confirming routine is executed.

Figure 17:
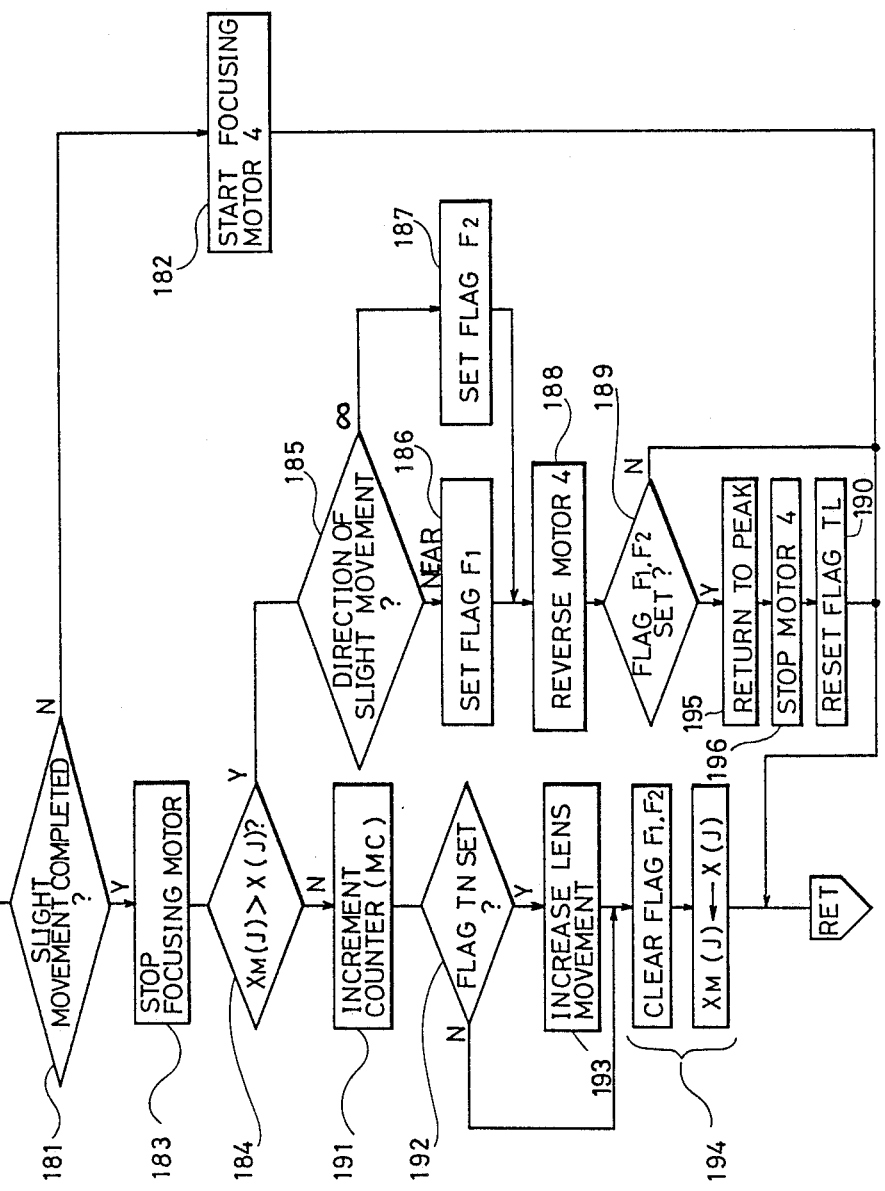
FIG. 17 is a flow chart showing a peak confirming routine.
Figure 18:
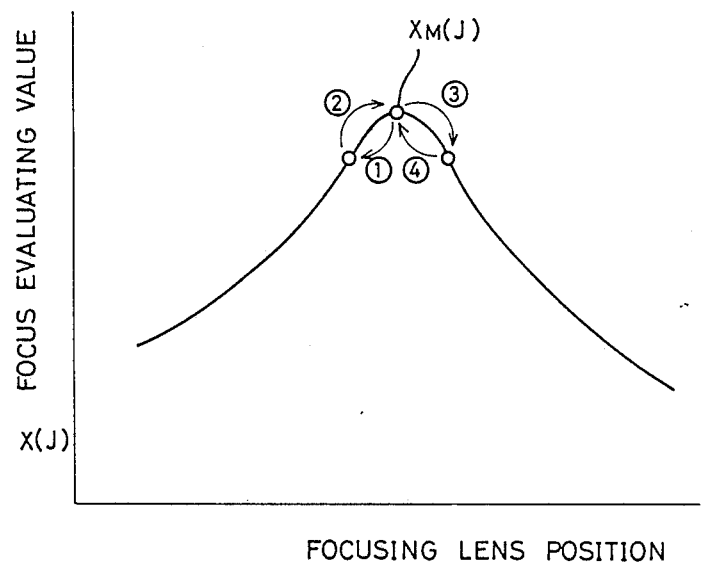
FIGS. 18 and 19 are graphs showing fluctuations in the focus evaluating value caused by the change of the position of the focusing lens.

This peak confirming routine is shown in a flow chart of FIG. 17. Referring to this flow chart, in the step 182, the focusing motor 4 is first driven by a small amount of such a degree that fluctuations in the angle of field cannot be recognized, for example, by one step of the focusing motor 4 which is a stepping motor in either direction, for example, in the direction of the near point (1 in FIG. 18). When it is determined in the step 181 that slight movement of the lens is terminated, the focusing motor 4 is immediately stopped in the step 183, so that a focus evaluating value X (J) and a maximum evaluating value $X_M$ (J) judged to be a peak in a focusing area in a field at the time of stopping are compared with each other in the step 184. In this case, the focusing area is a sampling area designated in the steps 131 to 133 shown in FIG. 15, according to the set state of the flag MAX2 used in the step 88 shown in FIG. 8 and in the step 118 shown in FIG. 10. The focusing area corresponds to the first sampling area A1 when J=1 while corresponding to the second sampling area A2 when J=2. As a result of the comparison in the step 184, when it is recognized that the focus evaluating value X (J) is smaller than the maximum evaluating value $X_M$ (J) and it is recognized in the step 185 that the direction of slight movement of the lens is the direction of the near point, the flag F1 is set in the step 186. The rotational direction of the focusing motor 4 is reversed in the step 188, so that the lens 2 is slightly moved by two steps in the reverse direction i.e., in the direction of the ∞ point and continuous to be slightly moved after it is returned to the peak ( 2 and 3 ) in FIG. 18). When it is confirmed again in the step 184 that the focus evaluating value X (J) is smaller than the maximum evaluating value $X_M$ (J), the flag F2 is set in the step 187 through the step 185. The rotational direction of the focusing motor 4 is reversed again in the step 188, so that the lens 2 continuous to be slightly moved in the reverse direction i.e., in the direction of the near point. When it is determined in the step 189 that the flags F1 and F2 are both set, it is recognized that a focus evaluating value obtained by slightly moving the lens in both directions as represented by arrows in FIG. 18 is smaller than the maximum evaluating value, so that it is confirmed that there is no error in the position detected as a peak. In the step 195, the focusing motor 4 is driven in the direction of the near point by an amount excessively operated in the direction of the ∞ point over the peak, to return the lens to the peak again. The focusing motor 4 is stopped in the step 196, and the peak confirming flag TL is reset in the step 190, to terminate the peak confirming routine.

Figure 19:
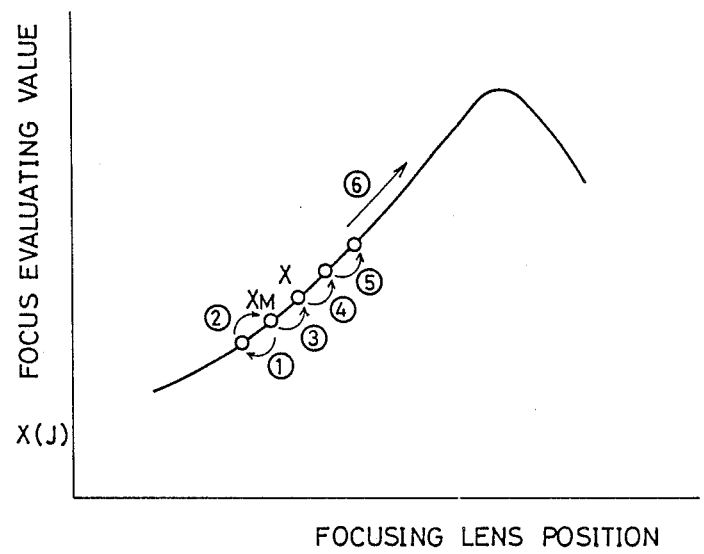

Additionally, as shown in FIG. 19, considering a case in which the peak is erroneously detected in the above described auto-focus operation, when the lens is slightly moved in either direction, the focus evaluating value X (1) becomes larger than the maximum evaluating value $X_M$ (1). Thus, the lens continuous to be slightly moved in the same direction without reversing the rotational direction of the focusing motor 4, to increment the number of times of movement which is the content of a counter MC representing the number of times of movement in the step 191.

Meanwhile, this peak confirming routine is executed in two kinds of cases: a case in which it is confirmed that the lens was surely returned to the peak immediately after the peak return routine is terminated and a case in which it is confirmed that the object changed after it is confirmed that the lens was returned to the peak. As described below, the cases differ from each other in that the peak confirming flag TN is set only in the latter case. In the step 192, the above described two kinds of cases are distinguished depending on whether or not this peak confirming flag TN is in the set state. When it is to be confirmed only whether or not the lens was surely returned to the peak immediately after the peak return routine is terminated, the step 193 as described below is skipped, so that a small amount of movement of the focusing motor 4 remains one step. The flags F1 and F2 are cleared in the step 194, so that the maximum evaluating value $X_M(J)$ is updated by a new focus evaluating value $X(J)$.

Thus, the peak confirming routine is repeated. Accordingly, when the lens is surely returned to the peak as shown in FIG. 18 immediately after the peak return routine is terminated, it is confirmed that the focus evaluating value changes as represented by arrows, so that lens is surely returned to the peak. On the other hand, when the lens is not surely returned to the peak as shown in FIG. 19, the focus evaluating value changes as represented by arrows, so that the maximum evaluating value $X_M(J)$ is updated for each change and the lens gradually approaches the in-focus position. In FIGS. 18 and 19, ① to ⑥ to indicate the order of movements.

In the evaluating value fluctuation monitoring routine, every time the peak confirming routine (in the step 152) is terminated, a count value of the counter MC is checked in the step 153. If the count value exceeds a predetermined allowable number of times, it is recognized that the peak is erroneously detected or the peak is moved due to the change in the object. More specifically, in FIG. 19, the allowable number of times is set to "3" so that it is recognized that the peak is erroneously detected after an operation of ⑤. When thus recognized, the peak confirmation allowing flag TL is reset in the step 154, and the rotational speed of the focusing motor 4 is switched to a standard speed s1 and the operation mode code is set to "2" in the step 155. Consequently, in the next automatic focusing routine, the above described hill-climbing routine is resumed. Considering a case in which the peak confirming routine is executed immediately after the peak return routine is terminated, when the peak is confirmed once, this operation is not carried out so long as the focus evaluating value does not fluctuate.

Description is now made of an operation of monitoring fluctuations in focus evaluating value caused by the change in object.

First, the amount of fluctuations of the focus evaluating value in the current field is defined based on the difference between the focus evaluating value $X(J)$ in the sampling area designated as a focusing area in the above described peak return routine out of the first and second sampling areas A1 and A2 and the maximum evaluating value $X_M(J)$ so far detected in the sampling area. In the step 156, one-eighth of the maximum evaluating value $X_M(J)$ in the focusing area is defined as a fifth threshold value THR5 (J) in the focusing area. The above described amount of fluctuations in the focus evaluating value and the fifth threshold value THR5 (J) are compared with each other in the step 157. When the amount of fluctuations exceeds this fifth threshold value THR5 (J), it is recognized that the object changed.

It is experimentally determined in advance that the above described fifth threshold value THR5 (J) is set to one-eighth of the maximum evaluating value $X_M(J)$ in each of the sampling areas A1 and A2. If the fifth threshold value THR5 (J) is set large, for example, one-fourth of the maximum evaluating value $X_M(J)$, it is difficult to detect the change of the object even if the object slightly changes. In addition, if the fifth threshold value THR5 (J) is set small, for example, to one-sixteenth of the maximum evaluating value $X_M(J)$, the change of the object is erroneously detected due to the effect of noises or the like even if the object does not change.

Figure 20:
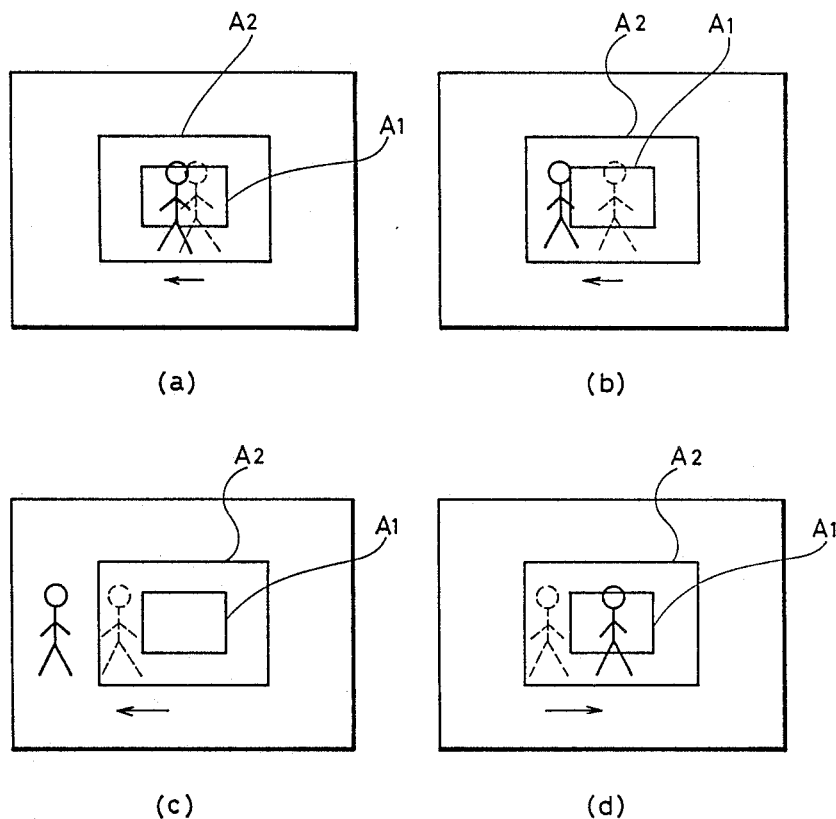
FIGS. 20(a)-20(d) are diagrams for typically explaining a manner in which an object moves.

At the time point when it is recognized that the object changed, it is determined in the step 158 which of the first and second sampling areas is designated as a focusing area. If and when the first sampling area A1 is designated as the focusing area so that the above described change in the object is confirmed, that is, when the object changed at the time of monitoring with respect to the first sampling area A1, it is determined in the step 159 whether the focus evaluating value in the second sampling area A2 fluctuates, that is, which of the difference between the focus evaluating value $X(2)$ and the maximum evaluating value $X_M(2)$ and the fifth threshold value THR5 (2) is larger. As a result, the difference is smaller than the fifth threshold value THR5 (2), it is considered that the object moves outside of the first sampling area A1 but stays in the second sampling area A2, as shown in FIG. 20 (b). Thus, in the step 160, the second sampling area A2 is selected as a focusing area serving as the subsequent focus evaluating value fluctuation monitoring area defining J=2, to continue a monitoring operation. Thus, movement of the object is monitored in the large and small sampling areas. Consequently, even if the object moves outside of a central portion of a picture after the in-focus state is achieved in the central portion thereof, the in-focus state can be maintained in a larger portion of the picture, so that the automatic focusing operation is stabilized. In FIGS. 20 (a) to 20 (d), a dotted line represents an object immediately before movement, and a solid line represents an object immediately after movement. In addition, FIG. 20 (a) shows a case in which the object moved in the first sampling area A1.

Figure 21:
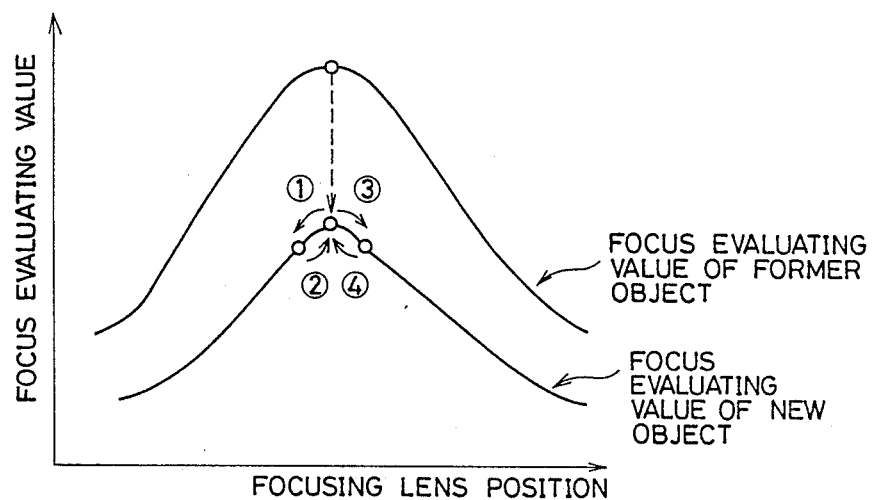
FIGS. 21 to 24 are graphs showing fluctuations in the focus evaluating value caused by the change of the object.
Figure 22:
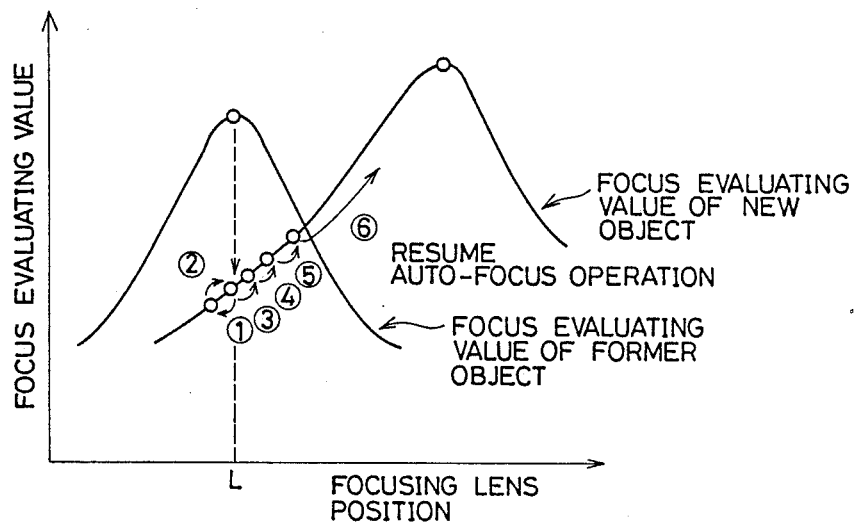

Then, it is determined in the step 159 that the difference between the focus evaluating value $X(2)$ and the maximum evaluating value $X_M(2)$ is the fifth threshold value THR5 (2) or more, it is considered that the object also moved outside of the second sampling area A2, as shown in FIG. 20 (c). Thus, in such a case, the autofocus operation must be resumed with respect to a new object. However, when fluctuations in the focus evaluating value in this case are due to mere horizontal movement and vertical movement of a camera which is not caused by the change in distance from the object to the lens or due to the change in brightness of the entire picture, it is considered that the focus evaluating value changes as shown in FIG. 21. In such a case, when a new in-focus operation is started, the picture becomes unclear. In order to distinguish the case as shown in FIG. 21 and the case in which the distance from the object to the lens is actually changed as shown in FIG. 22, when fluctuations in the focus evaluating value in the second sampling area A2 are detected, the maximum evaluating values $X_M(1)$ and $X_M(2)$ are updated by the focus evaluating values $X(1)$ and $X(2)$ in the current field in the steps 162 and 163, and the peak confirmation allowing flag TL for executing the peak confirming routine in the next filed and the peak confirming flag TN are further set in the step 164. Consequently, the peak confirming routine is resumed in the next field in the step 152, to determine whether fluctuations in the focus evaluating value are due to the change in shape of a pattern of the object or due to the change in distance.

Meanwhile, if and when the distance from the object to the lens is actually changed, it is desirable that the auto-focus operation is quickly resumed. Therefore, if it is determined in the step 184 in the peak confirming routine that the focus evaluating value $X(J)$ in the current field is the maximum evaluating value $X_M(J)$ or more and the focusing motor 4 is rotated by a very small amount in the same direction, it is further determined in the step 192 that the peak conforming flag TN at the time of fluctuations in the evaluating value is set. When it is determined that the peak confirming flag TN is set, the very small amount of rotation of the focusing motor 4, i.e., a very small amount of movement of the focusing lens 2 is gradually increased, for example, one step, three steps, five steps, ... every passage through the step 193, as compared with a case in which the peak confirming flag TL is not set, that is, the peak confirming routine is executed so as to confirm the peak immediately after the peak return routine is terminated. Consequently, as shown in FIG. 22, when the position of the lens is changed from a lens position L which is a peak in the case of a former object before the change in distance to a peak in the case of a new object after the change through the lens positions ①, ②, ③, ④., ⑤ and ⑥, the lens is displaced one step at a time in the lens positions (①, ②, and ③, the lens is displaced three steps at a time in the lens position ④, and the lens is displaced five steps at a time in the lens position ⑤, so that the lens quickly approaches an in-focus position. Similarly, an allowable number of times movement is set smaller than that in a case in which the peak confirming flag TN is in the reset state. In addition, in a case shown in FIG. 21, even if characteristics of the focus evaluating value in the case of the former object are changed to those in the case of the new object, operations in the step 185 and subsequent steps are carried out according to the determination in the step 184 shown in FIG. 17, so that the lens is immediately held in the original in-focus position.

Figure 23:
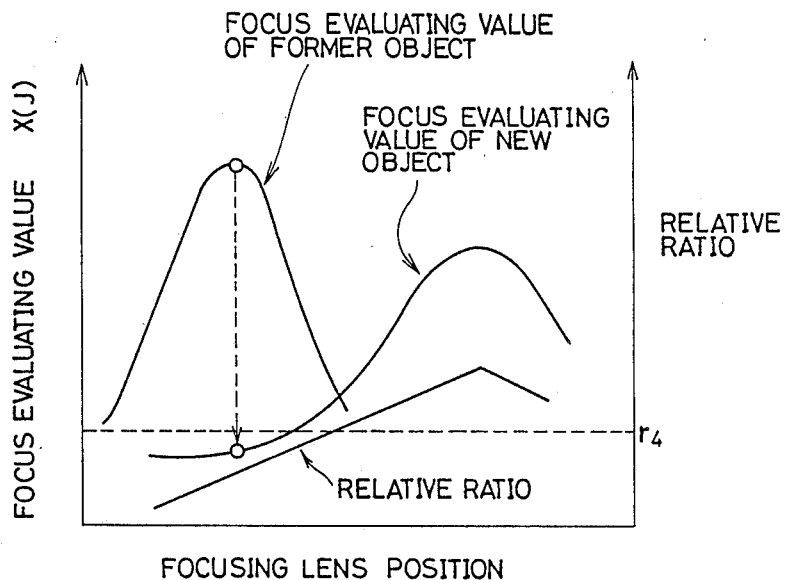

Meanwhile, the above described peak confirming operation requires that the slope of a moutain-like curve of a focus evaluating value is clear and the difference between focus evaluating values caused by slight movement of the lens can be detected, as shown in FIGS. 21 and 22. Thus, as shown in FIG. 23, in a portion where the slope of a mountain-like curve of characteristics of the focus evaluating value in the case of the new object is unclear, a malfunction is liable to occur. Therefore, in the sep 161 shown in FIG. 16, when it is determined that a relative ratio R (J) (J=1 or 2) in a sampling area currently designated as a focusing area is smaller than a fourth reference relative ratio r4 experimentally set in advance as a limit value at which it is recognized that a defocused state is not achieved, it is determined to be a portion where the slope is unclear as shown in FIG. 23, the operation mode code is immediately set to "0" in the step 165 without confirming a peak. Accordingly, in the automatic focusing routine in the next field, the focus evaluating value stability confirming routine is resumed.

Description is now made of a monitoring operation to occur when the difference between the focus evaluating value X (J) and the maximum evaluating value $X_M(J)$ is the fifth threshold value THR5 (J) or less, that is, the object does not change, as a result of the determination in the step 157.

Figure 24:
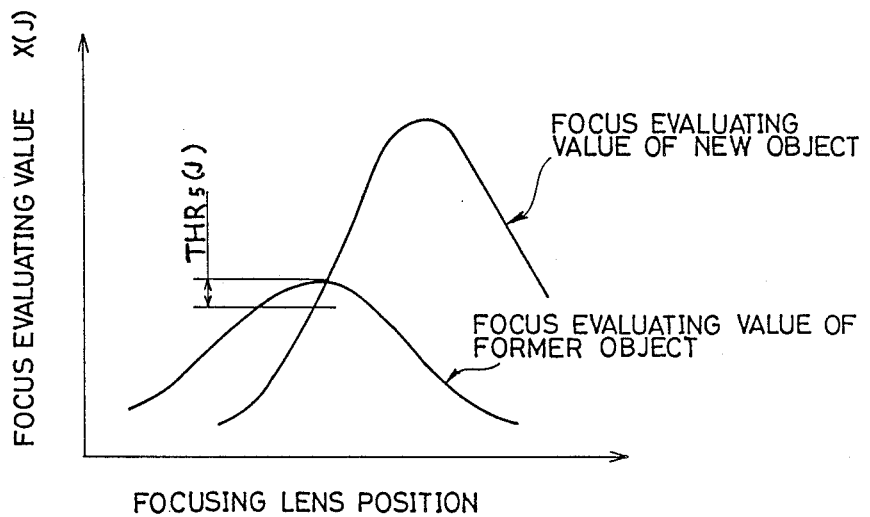

As shown in FIG. 24, a case is considered in which the focus evaluating value does not fluctuate but the object changes. Considering a case in which fluctuations in the focus evaluating value are not detected, if it is determined in the step 166 that the relative ratio R (J) in the current field is smaller than the third reference relative ratio r3 which is a threshold value which is considered to be significantly low as a peak, the program proceeds to the step 161, to perform the same processing as that performed when it is recognized that the focus evaluating value fluctuates. However, the determination of this relative ratio is limited to a case in which it is determined in the step 167 that a relative ratio at a peak in the case of an object which is currently brought into focus is the second reference relative ratio r2 or more in the above described hill-climbing routine, that is, the relative ratio OK flag is set.

Then, it is determined in the step 168 which of the first and second sampling areas A1 and A2 is designated as the current focusing area, and it is further determined in the step 169 whether the flag MAX2 is set. If the flag MAX2 is not set, that is, the focus evaluating value in the first sampling area A1 is larger as a focus evaluating value per unit area, it is determined in the step 170 whether or not the difference between the focus evaluating value X (1) and the maximum evaluating value $X_M(1)$ is the fifth threshold value THR5 (1) or less. If the difference is the fifth threshold value THR5 or less, it is determined that the object is returned from the state shown in FIG. 20 (b) to the state shown in FIG. 20 (d), that is, is returned to the first sampling area A1, to select the first sampling area A1 as a focusing area which is a focus evaluating value fluctuation monitoring area in the step 171 to continue a monitoring operation. Thus, immediately after the object is returned to the first sampling area A1, the smaller first sampling area is designated as the focusing area, thereby decreasing the possibility that the focus depends on the background of the larger second sampling area.

Meanwhile, in each drawing, the position of the focusing lens in the axis of abscissa corresponds to the distance from a front end position much spaced apart from the image sensor to the focusing lens in the direction of an optical axis in a stoke which is movable in the direction of the optical axis of the focusing lens.

As described in the foregoing, the auto-focus operation in the automatic focusing routine and an operation for confirming the change in the object after the in-focus state and correcting deviation are completed.

Additionally, as shown in the main routine, the automatic focusing routine is ceased every 32 fields, so that an automatic iris operation is carried out.

As described in the foregoing, according to an embodiment of the present invention, considering a case in which the focus evaluating value does not change although the distance from the lens to the object is changed after the in-focus state is achieved, when the relative ratio is below the reference value, the auto-focus operation is resumed. On the other hand, considering a case in which the focus evaluating value changes although the distance from the lens to the object is not changed after the in-focus state is achieved, so long as the relative ratio is not below the reference value, the auto-focus operation is not resumed, so that the picture can be prevented from being unclear.

Furthermore, when the relative ratio does not reach the reference value even if the focus evaluating value reaches a maximum in the auto-focus operation, the focus evaluating value is judged to be a false maximal point, so that termination of the auto-focus operation in the defocused state is prevented.

Figure 25:
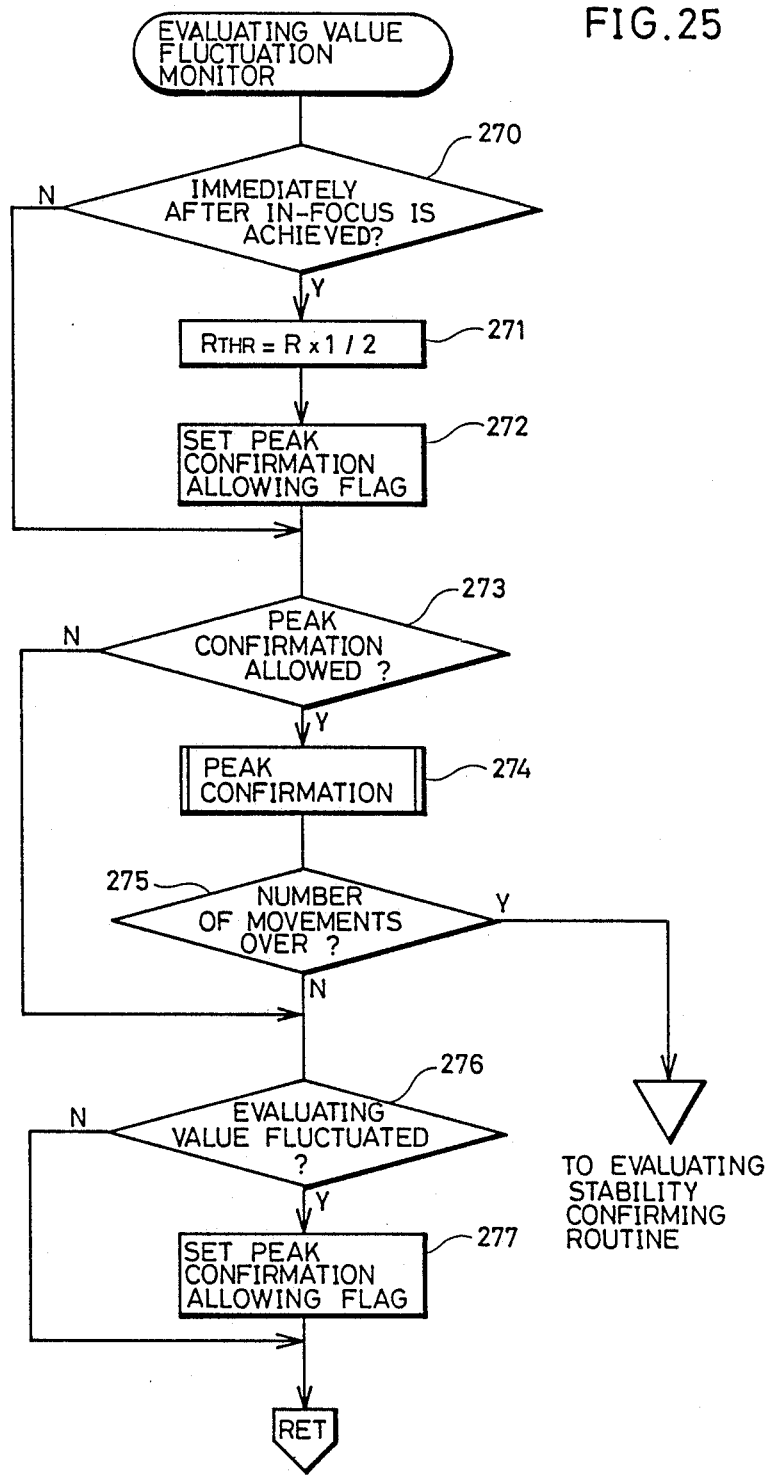
FIG. 25 is a flow chart showing an evaluating value fluctuation monitoring routine according to another embodiment of the present invention.

Then, FIG. 25 is a flowchart showing an evaluating value fluctuation monitoring routine according to another embodiment of the present invention. In the present embodiment, an evaluating value stability confirming routine, a direction determining routine, a hill-climbing routine and a peak return routine in an automatic focusing operation are the same as those shown as the above steps 45, 46, 47 and 48 and hence, description thereof is not repeated herein.

Figure 26:
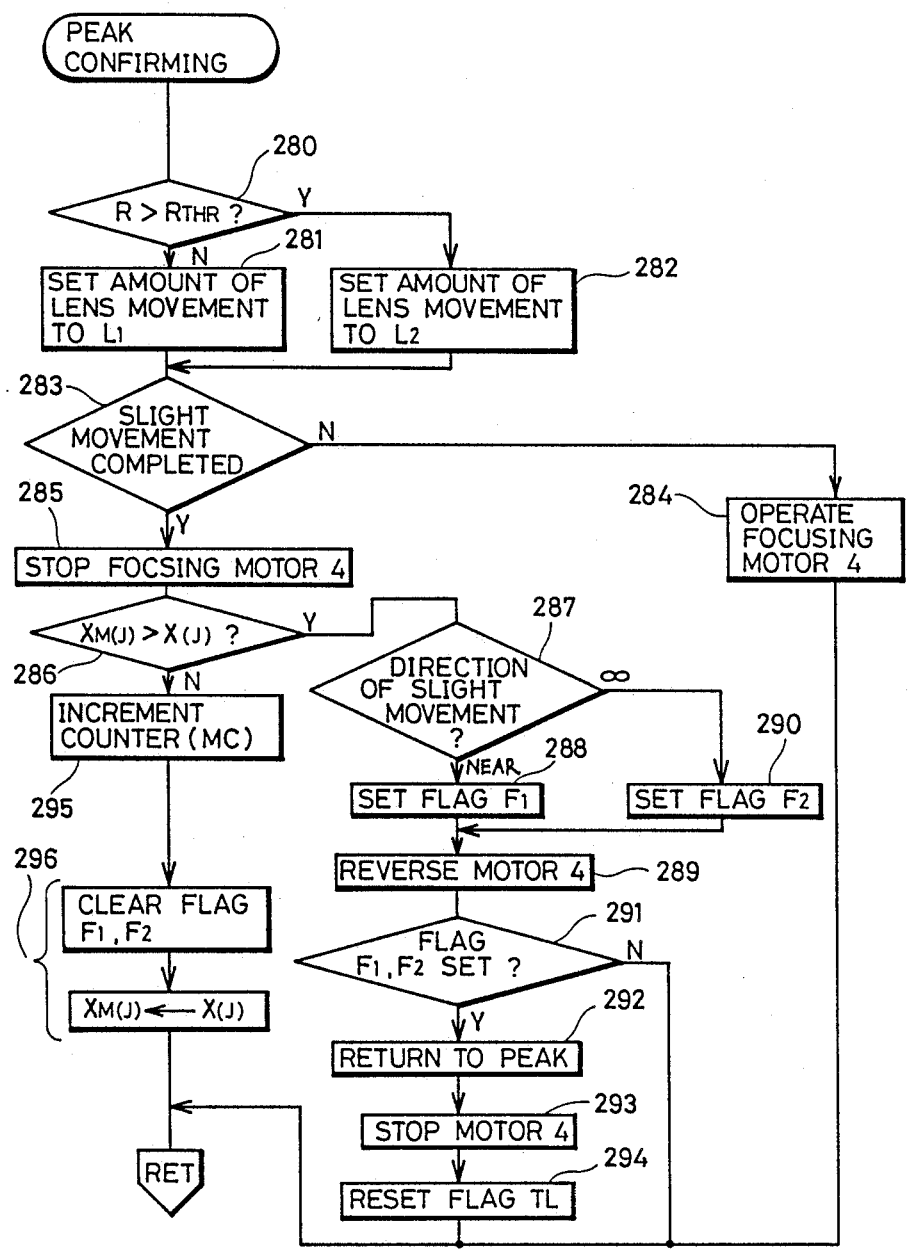
FIG. 26 is a flow chart showing a peak confirming routine according to another embodiment of the present invention.

First, it is determined in the step 270 shown in FIG. 25 whether or not the current field is a first field after the above described peak return routine (in the step 48) is terminated, that is, a field immediately after an auto-focus operation is terminated. If the current field is a field immediately after the auto-focus operation is terminated, one-half of a relative ratio R in the current field is defined as a threshold value $R_{THR}$ in the step 271, and a peak confirmation allowing flag TL is set in the step 272. Then, in the step 273, it is determined whether or not the peak confirmation allowing flag TL is in the set state. Immediately after the auto-focus operation is completed, the peak confirmation allowing flag TL is in the set state. Thus, in the step 274 in the succeeding state, a peak confirming operation is carried out. This peak confirming operation is carried out in a peak confirming routine shown in FIG. 26 (in the step 274).

This peak confirming routine will be described in detail. First, in the step 280, it is determined whether or not the relative ratio R is larger than the above described threshold value $R_{THR}$. When it is determined that the relative ratio R is larger than the threshold value $R_{THR}$, the amount of rotation per field of the focusing motor 4 is set to $L_2$ (for example, $L_2$=one step) in the step 282. On the other hand, when it is determined that the relative ratio R is smaller than the threshold value $R_{THR}$, the amount of rotation per field of the focusing motor 4 is set to $L_1$ (for example, $L_1$=three steps) in the step 281. In this case, it is assumed that the relation $L_1 > L_2$ always holds.

Figure 27:
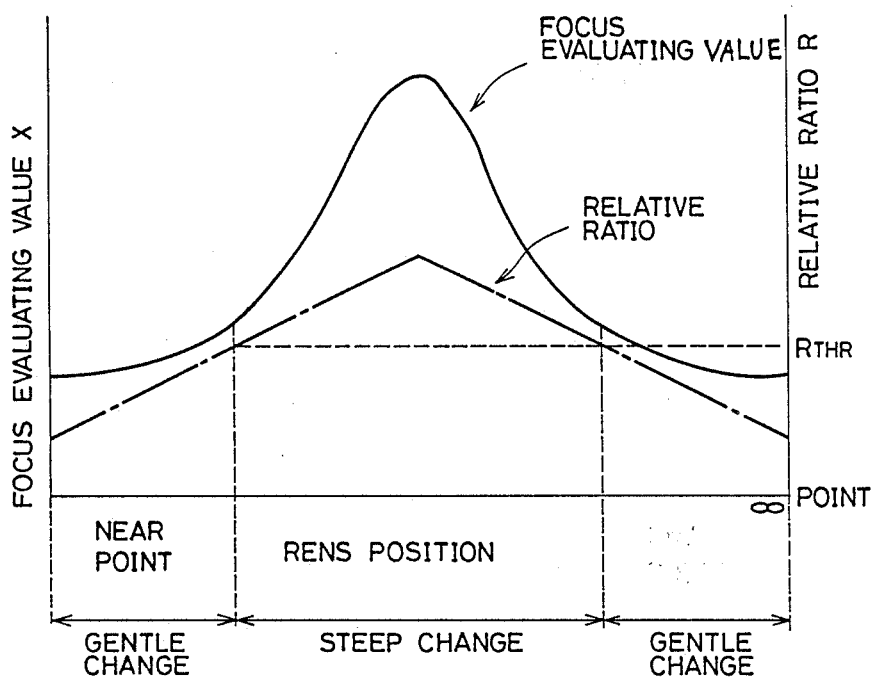
FIGS. 27 and 28 are graphs showing the relation among the position of the focusing lens, the focus evaluating value and the relative ratio.

In this case, the relation between the relative ratio R and the position of the focusing lens is as described with reference to FIGS. 13 and 14. If the monotone decreasing characteristic curve shown in FIG. 14 is represented corresponding to the position of the focusing lens, a characteristic curve is obtained which almost linearly changes to the sides of the near point or the ∞ point considering the in-focus position as a peak, as represented by a dot and dash line in FIG. 27. Thus, as a result of comparison of the threshold value $R_{THR}$ with the relative ratio R, the position of the focusing lens is in the vicinity of the in-focus position where the focus evaluating value steeply changed when the relative ratio R is larger than the threshold value $R_{THR}$, while being a position spaced apart from the in-focus position where the focus evaluating value gently changes when the relative ratio R is smaller than the threshold value $R_{THR}$.

Then, in the step 284, the focusing motor 4 is driven by a very small amount corresponding to the amount of slight movement of the lens set in the above described step 281 or 282 in either direction, for example, in the direction of the ∞ point. When it is determined in the step 283 that slight movement of the lens is completed, the focusing motor 4 is immediately stopped in the step 285, and a focus evaluating value X(J) in a focusing area in a field at the time of stopping and a maximum evaluating value $X_M(J)$ judged to be a peak in the hill-climbing routine 47 or the peak return routine 48 are compared with each other in the step 286. As a result of this comparison, when it is recognized that the focus evaluating value X(J) is smaller than the maximum evaluating value $X_M(J)$, a flag $F_2$ is set in the step 287 and 290, and the rotational direction of the focusing motor 4 is reversed in the step 289, to terminate once the peak confirming routine. On this occasion, since the peak confirming allowing flag TL remains in the set state, this peak confirming routine is executed in the next field. However, when the flag $F_2$ is set, the focusing motor 4 continues to be driven in the opposite direction, that is, in the direction of the near point until it is determined in the step 283 that the amount of movement of the focusing lens 2 reaches the above described small amount. Thus, after the focusing lens 2 is returned to the peak since the rotational direction of the focusing motor 4 started to be reversed in the step 289, the focusing lens 2 is further moved by a very small amount in the direction of the near point. Thereafter, the focusing motor 4 is stopped in this position in the step 285. When it is confirmed in the step 286 that the focus evaluating value X(J) is smaller than the maximum evaluating value $X_M(J)$, a flag $F_1$ is set in the step 288 through the step 287, and the rotational direction of the focusing motor 4 is reversed again in the step 289. If it is determined in the step 291 that the flags $F_1$ and $F_2$ are both set, it is recognized that the focus evaluating value obtained by slightly moving the focusing lens 2 in both directions as represented by arrows in FIG. 18 is smaller than the maximum evaluating value, so that it is confirmed that there is not error in the position detected as the peak. In the step 292, the focusing motor 4 is moved in the direction of the near point by an amount of excessive movement of the focusing lens 2 in the direction of the ∞ point over the in-focus position, to return the focusing lens 2 to the peak again. The focusing motor 4 is stopped in the step 293, and the peak confirmation allowing flag TL is reset in the step 294, to terminate the peak confirming routine.

Figure 28:
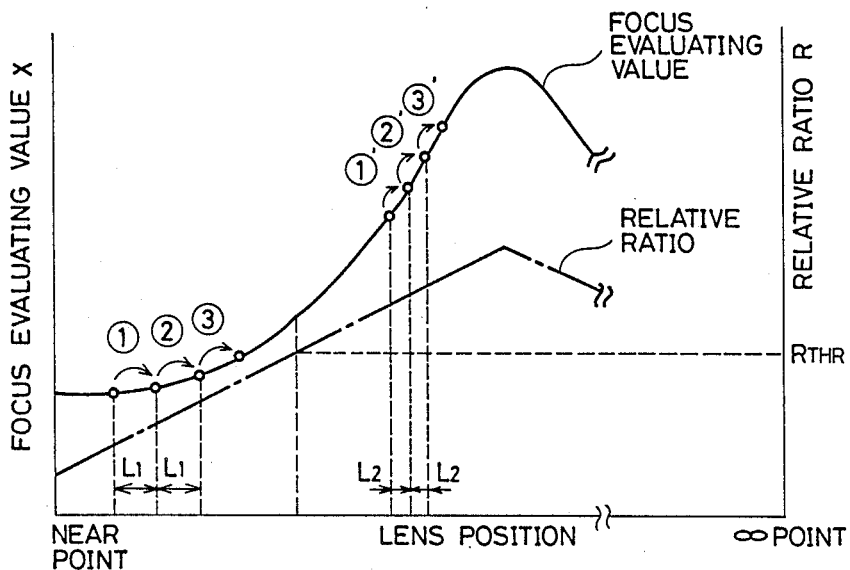

Additionally, as shown in FIG. 28, considering a case in which the peak is erroneously detected in the above described auto-focus operation, when the focusing lens 2 is slightly moved in the direction of the ∞ point, the focus evaluating value X(J) becomes larger than the maximum evaluating value $X_M(J)$, so that the focusing motor 4 continues to be slightly moved in the same direction for each field without reversing the rotational direction thereof. The number of times of movement which is the content of a counter MC is incremented in the step 295, and the flags $F_1$ and $F_2$ are cleared in the step 296, so that the maximum evaluating value $X_M(J)$ is updated by a new focus evaluating value X(J).

Meanwhile, since in the step 281 and 282, the amount of slight movement of the lens is set to $L_1$ or $L_2$ depending on whether the focus evaluating value X(J) changes steeply or gently. Thus, in a region where the focus evaluating value changes gently, the amount of slight movement of the lens is larger than that in a region where it changes steeply, so that the change of the focus evaluating value in the previous field and in the current field becomes distinct, whereby erroneous determination in the step 286 is prevented. In addition, in the region where the focus evaluating value changes steeply, that is, in the vicinity of the in-focus position, the amount of movement is set extremely small such as $L_2$ (for example, one step). If the lens moves over the peak while repeating the steps 295 and 296, it is determined in the step 286 that $X_M(J) > X(J)$. Thereafter, as in the above described case, a fine adjustment operation to achieve the return to the peak is executed (in the steps 287 to 292). Meanwhile, when the return to the peak is achieved due to such continuous movement of the lens in one direction, the counter MC for counting the number of times of movement is reset at this time point.

When the peak confirming routine 274 is terminated, a count value of the counter MC is checked in the step 275 (in FIG. 25). If this count value exceeds an allowable number of times previously set, it is recognized that the peak is erroneously detected or the peak moves due to the change of the object. More specifically, the allowable number of times is set to "3" in FIG. 28, it is recognized that the peak is erroneously detected after an operation of ③ or ③'. On this occasion, the auto-focus operation is carried out again. More specifically, a code indicating an auto-focus operation mode is changed to "0", so that the evaluating value stability confirming routine is resumed.

Then, in the step 276, it is determined whether or not the difference between the maximum evaluating value $X_M(J)$ and the focus evaluating value $X(J)$ in the current field is within an allowable range, to determine whether or not the focus evaluating value fluctuated. When the focus evaluating value fluctuated beyond the allowable range, the peak confirmation allowing flag TL is set in the step 277. In the next field, the peak confirming routine is executed again in the step 273. In addition, when it is not recognized that the focus evaluating value fluctuated, the peak confirmation allowing flag TL is not set. However, so long as the peak confirmation allowing flag TL is not reset in the step 294, the peak confirming routine is executed in the next field.

Although in the above described embodiment, the sum of every continuous two fields of high frequency components having different band extracted using outputs of the first and second HPFs 9 and 10 is defined as the focus evaluating value, an integrated value extracted using an output of either one of the first and second HPFs 9 and 10 can be defined as the focus evaluating value.

Additionally, a region having a threshold value of the above described relative ratio is subdivided so that the amount of slight movement of the lens can be set to more steps.

As described in the foregoing, according to another embodiment of the present invention, the amount of slight movement of the focusing lens for confirming the peak is selected, corresponding to a case in which the factor of change of the focus evaluating value depends on the change in distance from the lens to the object or a case in which it depends on lateral movement of the object and the change in shape of the object itself. Accordingly, if it depends on the change of the distance, confirmation of the movement of the object is given priority. Contrary to this, if it does not depend on the change of the distance, such fact is confirmed while minimizing the degree of defocusing in the picture.

Figure 29:
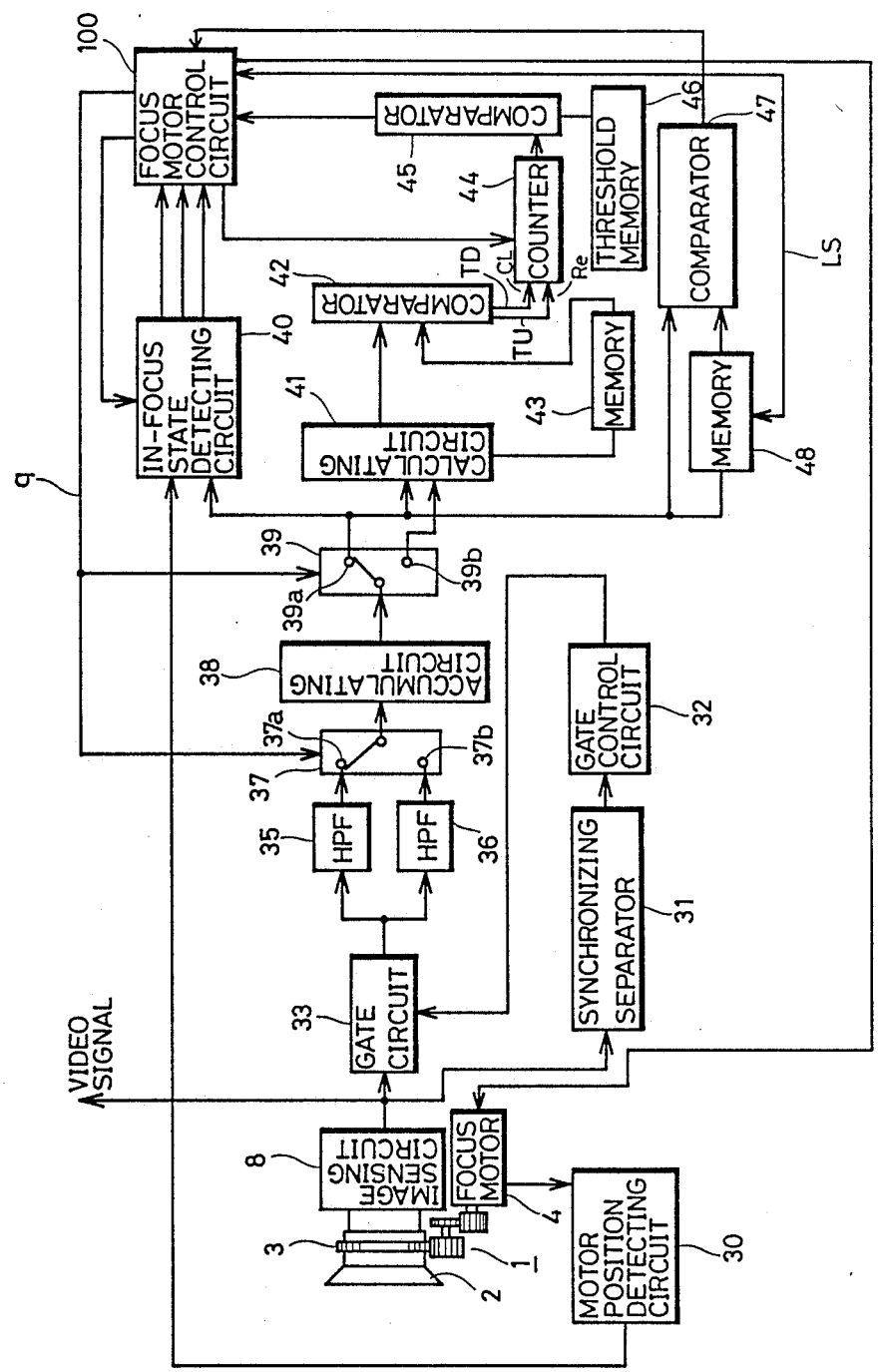
FIG. 29 is a schematic block diagram showing an automatic focusing apparatus according to still another embodiment of the present invention.
Figure 30:
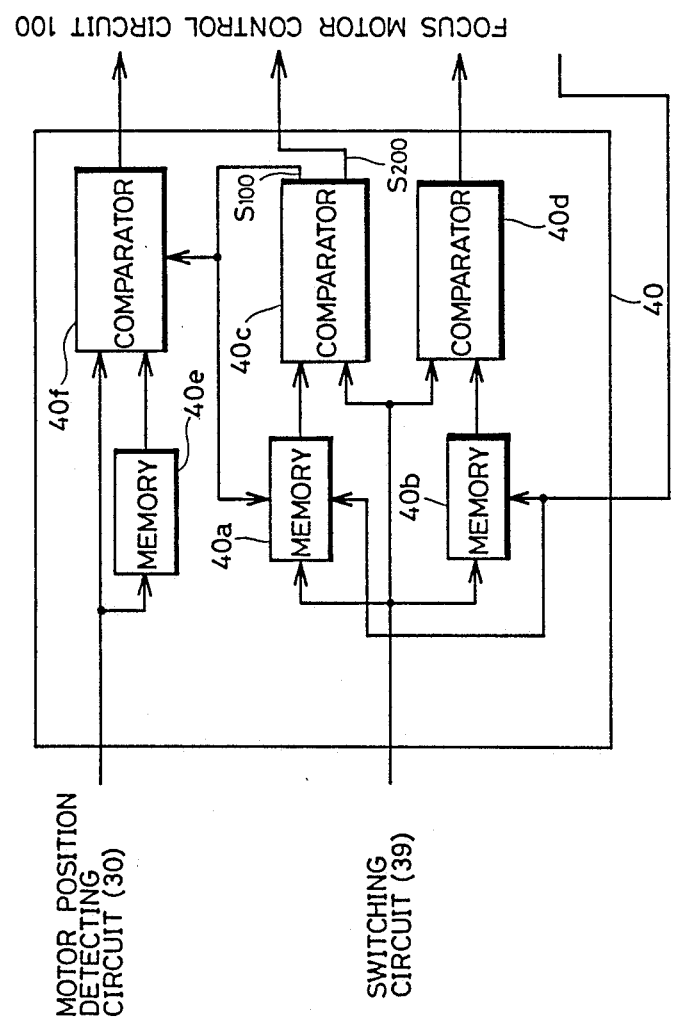
FIG. 30 is a block diagram showing the details of an in-focus state detecting circuit of the automatic focusing apparatus shown in FIG. 29.

FIG. 29 is a schematic block diagram showing an automatic focusing apparatus according to still another embodiment of the present invention. In FIG. 29, an image formed on the surface of an image sensor by a focusing lens 2 is converted into a video signal by an image sensing circuit 8, a luminance signal therein being inputted to a gate circuit 33 and a synchronizing separator circuit 31. Only a luminance signal in a sampling area set in the center of a picture by a gate control circuit 32 is inputted to a first and second filter circuits 35 and 36 in the succeeding stage through the gate circuit 33. Each of the filter circuits 35 and 36 is a high-pass filter (HPF) for extracting only a high frequency component of the luminance signal, the first filter circuits 35 having a higher cut-off frequency than that of the second filter circuit 36. More specifically, the cut-off frequencies of the first and second filter circuits 35 and 36 are respectively set to 600 KHz and 200 KHz. Outputs of the filter circuits 35 and 36 are alternatively selected by a switching circuit 37 controlled by a focusing motor control circuit 100, to be inputted to an accumulating circuit 38. The accumulating circuit 38, which comprises a detector, an A/D converter, and an accumulating circuit (not shown), amplitude-detects an inputted output of a filter and then, converts the amplitude-detected output into a digital value, and further accumulates digital values corresponding to one field to output the same. The first filter circuit 35, the switching circuit 37, and the accumulating circuit 38 constitute a first focus evaluating value detecting circuit, and the second filter circuit 36, the switching circuit 37, and the accumulating circuit 38 constitute a second focus evaluating value detecting circuit.

Since the first focus evaluating value detecting circuit has a higher cut-off frequency than that of the second focus evaluating value detecting circuit, a first focus evaluating value A which is an output of the first focus evaluating value detecting circuit has a steeper mountain-like curve than a second focus evaluating value B which is an output of the second focus evaluating value detecting circuit, as shown in FIG. 13.

An output of the accumulating circuit 38 is provided to a switching circuit 39. The switching circuit 39 is controlled by the focusing motor control circuit 100, to alternatively select the first and second focus evaluating values, similarly to the switching circuit 37. The first focus evaluating value A is inputted to an in-focus state detecting circuit 40.

The in-focus state detecting circuit 40 comprises a memory 40a holding the maximum value, a memory 40b holding the initial value, a first comparator 40c, a second comparator 40d, a memory 40e holding the position of a motor, and a third comparator 40f.

Immediately after an auto-focus operation is started, the first focus evaluating value A applied from the switching circuit 39 for the first time is held in the maximum value memory 40a and the initial value memory 40b. Thereafter, the focusing motor control circuit 100 rotates a focusing motor 4 in a predetermined direction while monitoring an output of the second comparator 40d to rotate a focusing ring 3 for supporting the focusing lens 2, to displace the focusing lens 2 in the direction of an optical axis to change the distance between the focusing lens 2 and the image sensor. The second comparator 40d compares the focus evaluating value after driving the focusing motor 4 with the initial evaluating value held in the initial value memory 40b, to output a signal indicating the result of the comparison.

The focusing motor control circuit 100 rotates the focusing motor 4 in the initial direction until the second comparator 40d provides an output indicating the result of the comparison, to hold the rotational direction in the present state if an output indicating that the current focus evaluating value is larger than the initial evaluating value while reversing the rotational direction of the focusing motor 4 to monitor an output of the first comparator 40c if it is determined that the current evaluating value is smaller than the initial evaluating value.

The first comparator 40c compares the maximum focus evaluating value so far held in the maximum value memory 40a with the current evaluating value, to output two kinds of comparison signals S100 and S200, that is, the signal in first mode in which the current focus evaluating value is larger than the content of the maximum value memory 40a and the signal in the second mode in which the correct focus evaluating value is decreased to be smaller than the content of the maximum value memory 40a by a previously set threshold value R1 or more. If and when the current focus evaluating value is larger than the contact of the maximum value memory 40a, the value is updated in response to the output of the first comparator 40c, so that the maximum value of the focus evaluating value so far is always held in the maximum value memory 40a.

A motor position detecting circuit 30 is used for detecting the position of the focusing motor 4. More specifically, the motor position detecting circuit 30 is an up-down counter for counting up FG pulses (for example, 100 pulses are generated per one rotation) outputted from the focusing motor 4 in response to the rotation of the focusing motor 4. This motor position detecting circuit 30 adds the FG pulses when the focusing motor 4 is rotated in a direction to move the lens from the near point to the $\infty$ point while subtracting the FG pulses when it is rotated in the reverse direction. Thus, a count value itself of this counter is the position of a motor, which is outputted as a signal indicating the position of a motor.

The motor position memory 40e stores the position of the focusing motor 4 upon receipt of the motor position signal indicating the rotational position of the focusing motor 4 from the motor position detecting circuit 30. This motor position memory 40e is updated in response to the output of the first comparator 40c such that the position of the motor where the focus evaluating value reaches the maximum is always held, similarly to the maximum value memory 40a. The focusing ring 3 supports the focusing lens 2, to move the focusing lens 2 in the direction of an optical axis by the rotation of the ring itself. Thus, the above described position of the motor almost corresponds to the position in the direction of an optical axis of the focusing lens 2.

The focusing motor control circuit 100 monitors the output of the first comparator 40c while rotating the focusing motor 4 in the direction determined in response to the output of the second comparator 4d, to reverse the rotational direction of the focusing motor 4 simultaneously with the instruction of the second mode indicating that the focus evaluating value is smaller than the maximum evaluating value by the previously set threshold value R1 or more.

By reversing the focusing motor 4, the direction of movement of the focusing lens 2 is changed, for example, from a direction to approach the image sensor to a direction to move farther apart from the image sensor, or vice verse.

Figure 31:
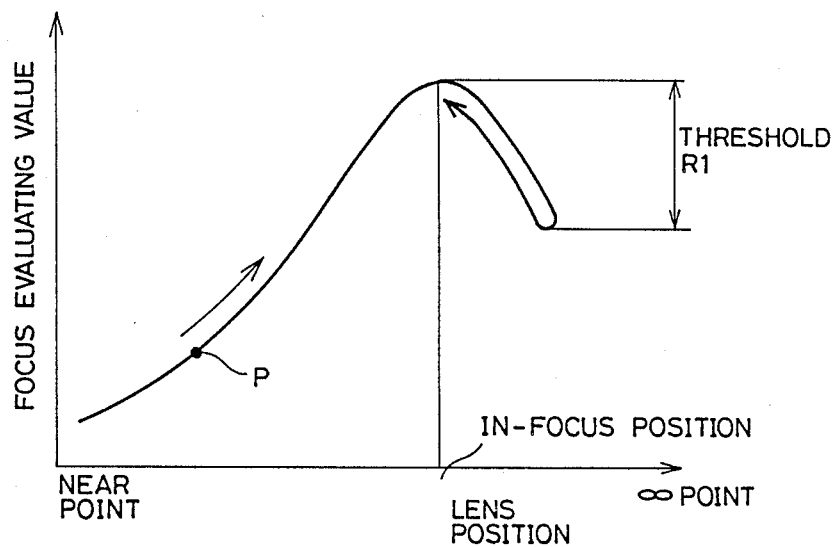
FIG. 31 is a graph showing the relation between the position of a focusing lens and a focus evaluating value according to still another embodiment of the present invention.
Figure 32:
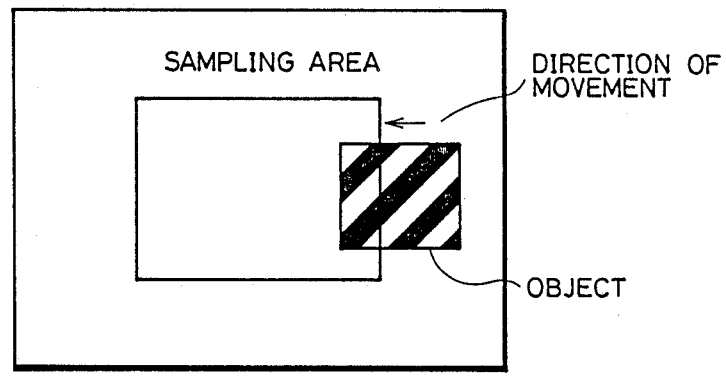
FIG. 32 is a diagram typically showing a manner in which an object having a large high frequency component moves into a sampling area.

After the rotational direction of this focusing motor is reversed, the third comparator 40f compares the content of the motor position memory 40e with the current motor position signal. The focusing motor control circuit 100 functions so as to stop the focusing motor 4 when both coincide with each other, that is, the focusing ring 3 is returned to a position where the focus evaluating value reaches the maximum. At the same time, the focusing motor control circuit 100 outputs a lens stop signal LS. FIG. 31 is a graph showing the relation between the position of the lens and the focus evaluating value in the above described auto-focus operation, where point P indicates the initial position of the focusing lens 2.

At the same time that the auto-focus operation by the focusing motor control circuit 100 is terminated so that the lens stop signal LS Is generated, the fourth memory 48 holds a focus evaluating value at the time point. In addition, the fourth comparator 47 in the succeeding stage compares the content held in the fourth memory 48 with the current focus evaluating value. When the current focus evaluating value decreases to be smaller than the content of the fourth memory 48 by the previously set threshold value or more, it is determined that the object changed, so that a signal indicating that an object changed is outputted. The focusing motor control circuit 100 carries out the auto-focus operation again to follow the change of the object upon receipt of this signal.

Meanwhile, the switching circuits 37 and 39 are switched in synchronization with each other in response to a switching signal q from the focusing motor control circuit 100. More specifically, if and when the switching circuit 37 is switched to the side of a fixed contact 37a, the switching circuit 39 is switched to the side of a fixed contact 39a. Contrary to this, when the switching circuit 37 is switched to the side of a fixed contact 37b, the switching circuit 39 is switched to the side of a fixed contact 39b. In addition, since the switching signal q is generated for each field, the switching circuits 37 and 39 are switched for each field. Therefore, the first focus evaluating value A at the fixed contact 39a and the second focus evaluating value B at the fixed contact 39b are updated every two fields. i.e., every one frame.

The in-focus state detecting circuit 40 carries out the auto-focus operation based on the first focus evaluating value A at the fixed contact 39a as described above. However, this focus evaluating value is updated every one frame as described above, so that a comparing operation of each of the comparators constituting the in-focus state detecting circuit 40 is carried out for each frame. The focusing motor control circuit 100 controls driving of the focusing motor 4 in response to an output of this in-focus state detecting circuit 40 so that hill-climbing control to the in-focus position is achieved as shown in FIG. 31.

On the other hand, the two kinds of focus evaluating values A and B outputted from the switching circuit 39 during the above described auto-focus operation in the in-focus state detecting circuit 40 are inputted to an calculating circuit 41. The calculating circuit 41 divides the first focus evaluating value A by the second focus evaluating value B, to calculate R (=A/B) which is a relative ratio thereof to apply the same to a fifth comparator 42. This relatives ratio R is calculated using both the newest focus evaluating values every time either one of the first and second focus evaluating values is updated.

The relation between this relative ratio R and the degree of defocusing of the object is as shown in FIG. 14 as described above.

The fifth comparator 42 compares this calculated relative ratio with the previous result stored in the fifth memory 43, that is, the relative ratio one field before, to generate a decrease detecting pulse TD to increment a counter 44 when the present value is smaller so that it is considered that the object is defocused while generating an increase detecting pulse TU to reset the counter 44 when the present value is larger. A count value of the counter 44 is compared with a predetermined value N previously stored in a memory 46 holding a threshold value by a sixth comparator 45. When the counter value reaches N, that is, the relative ratio R is decreased over continuous predetermined N fields, it is determined that the lens moves farther away from the in-focus position, so that the sixth comparator 45 applies an inversion instructing signal for inverting the motor 4 to the focusing motor control circuit 100. This number N of times is set to a suitable value obtained by an experiment. In addition, the result of the calculating circuit 41 is stored in the fifth memory 43 after the comparison by the fifth comparator 42 is terminated.

The focusing motor control circuit 100 reverse the rotational direction of the focusing motor 4 immediately after receiving the inversion instruction signal from the sixth comparator 45, to carry out the auto-focus operation from the beginning.

Thus, if and when the second focus evaluating value B is increased although the lens moves farther away from the in-focus position, this is detected from the increase or decrease of the relative ratio R, so that the movement of the lens to an erroneous direction can be prevented.

Figure 33:
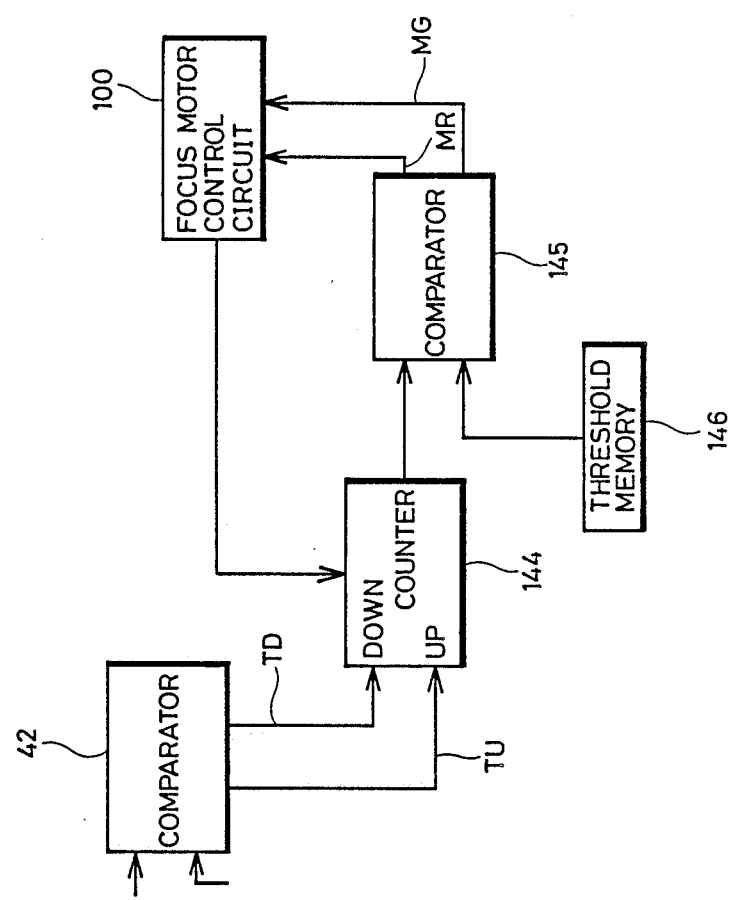
FIG. 33 is a block diagram showing a still modified example of the automatic focusing apparatus according to the embodiment shown in FIG. 29.

Although in the above described embodiment showing FIG. 29, only a case is noted in which the relative ratio R tends to be decreased, it is possible to control inversion of the focusing motor 4 when the relative ratio R tends to be increased. For example, as shown in FIG. 33, the counter 44 shown in FIG. 29 may be replaced with an up-down counter 144 counted down by the decrease detecting pulse TD from the fifth comparator 42 and counted up by the increase detecting pulse TU therefrom. In this case, a count value of the counter 144 is compared with a threshold value previously set in a threshold value memory 146 by a seventh comparator 145. As a result of this comparison, a signal MG for instructing the limit of inversion and a signal MR for instructing inversion are respectively inputted to the focusing motor control circuit 100 when the count value is $+N$ or more and when it is $-N$ or less. When the lens approaches the in-focus position so that the first focus evaluating value A falls below the maximum value by threshold value R1, the focusing motor control circuit 100 attempts to reverse the rotational direction of the motor 4 in response to the output from the in-focus state detecting circuit 40. However, when the relative ratio R tends to be increased, the inversion limit instructing signal MG is applied to the focusing motor control circuit 100 so that the rotational direction of the focusing motor 4 is prevented from being reversed, whereby the auto-focus operation is carried out again. Thus, if and when the lens actually approaches the in-focus position but the first focus evaluating value A is decreased, this is detected from the increase or decrease of the relative ratio R, so that the lens can be prevented from being moved to to an erroneous direction. The counters 44 and 144 are both reset once at the time point when the auto-focus operation is carried out again.

Although in the above described embodiment shown in FIG. 29, fluctuations in the relative ratio R are detected using the number of times of continuous change in the same direction, it should be noted that the present invention is not limited to the same. Alternatively, a method is considered which utilizes the relative ratio R at the time point when the motor 4 starts to be rotated in the present direction as a reference value and uses the difference between this reference value and the current relative ratio.

Furthermore, although in the above described embodiment shown in FIG. 29, the first focus evaluating value A is used for the auto-focus operation in the in-focus state detecting circuit 40, it should be noted that the present invention is not limited to the same. Alternatively, the second focus evaluating value B can be used. In addition, the first focus evaluating value A can be used in the vicinity of the in-focus position where the focus evaluating value significantly changes, and the second focus evaluating value B or the sum $A+B$ of the first and second focus evaluating values can be used in a position spaced apart from the in-focus position.

Figure 34:
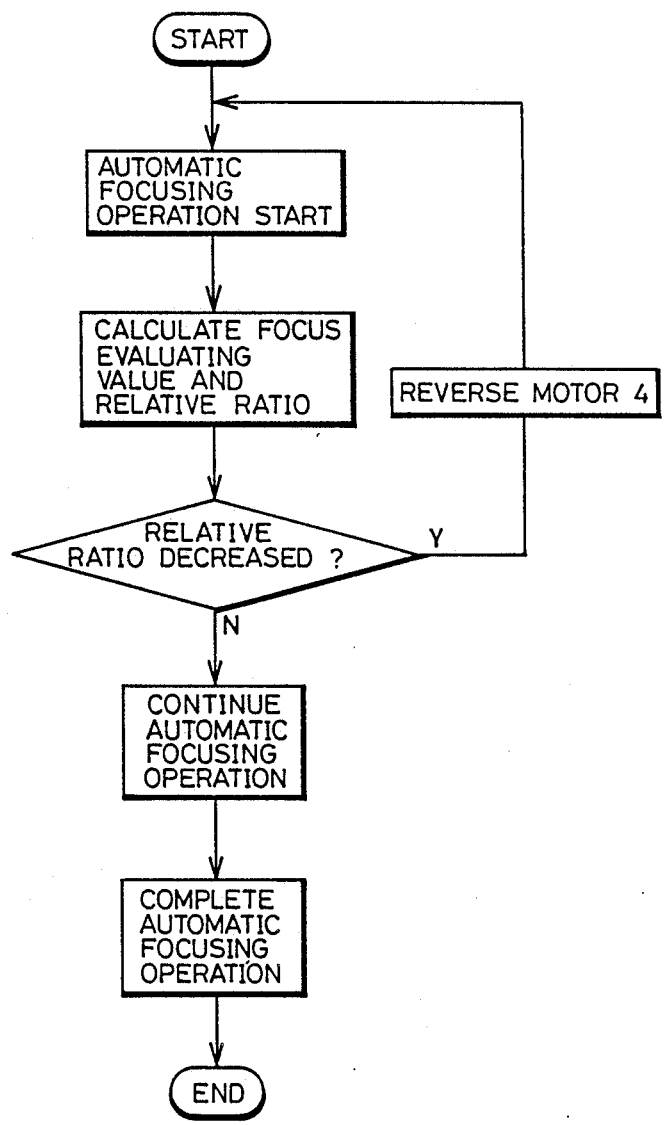
FIG. 34 is a flow chart in a case in which the embodiment shown in FIG. 29 is achieved in a software manner.

Additionally, the circuits operation shown in FIG. 29 can be processed in a software manner using a microcomputer. FIG. 34 is a flowchart showing an operation at that time.

As described in the foregoing, according to the embodiment shown in FIG. 29, even if the focus evaluating value fluctuated due to the change of the object in the sampling area, it can be correctly determined whether or not the lens moves toward the in-focus direction based on the relative ratio of the focus evaluating values, so that an erroneous automatic focusing operation can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, first focus evaluating value detecting means (9, 13, 14, 16) for detecting every constant time period a level of a first high frequency component in said video signal to supply the same as a first focus evaluating value, second focus evaluating value detecting means (10, 13, 14, 16) for detecting every constant time period a level of a second high frequency component including a component at a frequency which is lower than the frequency of said first high frequency component in said video signal to supply the same as a second focus evaluating value, each of said first and second focus evaluating values being a focus evaluating value which reaches the maximum value in an in-focus position, means (26) for detecting a true focus evaluating value to supply the same based on at least one of said first and second focus evaluating values, relative ratio calculating means (26) for calculating a relative ratio of said first and second focus evaluating values, in-focus state control means (26) for carrying out an automatic focusing operation for controlling said relative position changing means based on said true focus evaluating value so as to fix the relative position of said focusing lens to a position where said true focus evaluating value reaches the maximum value, and means (26) for comparing said relative ratio with a reference value to allow resumption of the automatic focusing operation by said in-focus state control means only when said relative ratio is said reference value or less after the relative position of said focusing lens is fixed once to a position where said focus evaluating value reaches the maximum value.

2. The image sensing apparatus according to claim 1, wherein said first focus evaluating value detecting means comprises first filter means for extracting the level of said first high frequency component in said video signal, and said second focus evaluating value detecting means comprises second filter means for extracting the level of said second high frequency component in said video signal.

3. The image sensing apparatus according to claim 1, wherein said means for detecting the true focus evaluating value comprises switching means for alternatively selecting every said constant time period said first and second focus evaluating values outputted from said first and second focus evaluating value detecting means, first memory means for holding the first focus evaluating value selected by said switching means, second memory means for holding the second focus evaluating value selected by said switching means, and means for adding every said constant time period the newest contents of said first and second memory means to supply the result obtained by the addition as said true focus evaluating value.

4. The image sensing apparatus according to claim 1, wherein said relative ratio calculating means comprises means for calculating a relative ratio of said first focus evaluating value to said second focus evaluating value.

5. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, first focus evaluating value detecting means (9, 13, 14, 16) for detecting every constant time period a level of a first high frequency component in said video signal to supply the same as a first focus evaluating value, second focus evaluating value detecting means (10, 13, 14, 16) for detecting every constant time period a level of a second high frequency component including a component at a frequency which is lower than the frequency of said first high frequency component to supply the same as a second focus evaluating value, each of said first and second focus evaluating values being a focus evaluating value which takes the maximum value in an in-focus position, means (26) for detecting a true focus evaluating value based on at least one of said first and second focus evaluating values, relative ratio calculating means (26) for calculating a relative ratio of said first and second focus evaluating values, in-focus state control means (26) for carrying out an automatic focusing operation for controlling said relative position changing means based on said true focus evaluating value so as to fix the relative position of said focusing lens to a position where said true focus evaluating value reaches the maximum value, and mean (26) for comparing said relative ratio with a reference value to control said relative position changing means so as not to fix the relative position of said focusing lens when said relative ratio does not reach said reference value even if said true focus evaluating value reaches the maximum value.

6. The image sensing apparatus according to claim 5, wherein said first focus evaluating value detecting means comprises first filter means for extracting the level of said first high frequency component in said video signal, and said second focus evaluating value detecting means comprises second filter means for extracting the level of said second high frequency component in said video signal.

7. The image sensing apparatus according to claim 5, wherein said means for detecting the true focus evaluating value comprises switching means for alternately selecting every said constant time period said first and second focus evaluating values outputted from said first and second focus evaluating value detecting means, first memory means for holding the first focus evaluating value selected by said switching means, second memory means for holding the second focus evaluating value selected by said switching means, and means for adding every said constant time period the newest contents of said first and second memory means to supply the result obtained by the addition as said true focus evaluating value.

8. The image sensing apparatus according to claim 5, wherein said relative ratio calculating means comprises means for calculating a relative ratio of said first focus evaluating value to said second focus evaluating value.

9. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, first focus evaluating value detecting means (9, 13, 14, 16) for detecting every constant time period a level of a first high frequency component in said video signal to supply the same as a first focus evaluating value, second focus evaluating value detecting means (10, 13, 14, 16) for detecting every constant time period a level of a second high frequency component including a component at a frequency which is lower than the frequency of said first high frequency component to supply the same as a second focus evaluating value, each of said first and second focus evaluating values being a focus evaluating value which reaches the maximum value in an in-focus position, means (26) for detecting a true focus evaluating value based on at least one of said first and second focus evaluating values, relative ratio calculating means (26) for calculating a relative ratio of said first and second focus evaluating values, in-focus state control means (26) for carrying cut an automatic focusing operation for controlling said relative position changing means based on said true focus evaluating value so as to fix the relative position of said focusing lens to a position where said true focus evaluating value reaches the maximum value, means (26) for carrying out an object change confirming operation for confirming the presence or absence of the change of said object by changing the relative position of said focusing lens by a variable very small amount of change a plurality of times after the relative position of said focusing lens is fixed once to a position where said true focus evaluating value reaches the maximum value, and means (26) for comparing said relative ratio with a reference value to decrease said variable very small amount of change in said object change confirming operation when said relative ratio is larger than said reference value, as compared with a case in which said relative ratio is smaller than said reference value.

10. The image sensing apparatus according to claim 9, wherein said first focus evaluating value detecting means comprises first filter means for extracting the level of said first high frequency component in said video signal, and said second focus evaluating value detecting means comprises second filter means for extracting the level of said second high frequency component in said video signal.

11. The image sensing apparatus according to claim 9, wherein said means for detecting the true focus evaluating value comprises switching means for alternately selecting every said constant time period said first and second focus evaluating value outputted from said first and second focus evaluating value detecting means, first memory means for holding the first focus evaluating value selected by said switching means, second memory means for holding the second focus evaluating means selected by said switching means, and means for adding every said constant time period the newest contents of said first and second memory means to supply the result obtained by the addition as said true focus evaluating value.

12. The image sensing apparatus according to claim 9, wherein said relative ratio calculating means comprising means for calculating a relative ratio of said first focus evaluating value to said second focus evaluating value.

13. The image sensing apparatus according to claim 9, wherein said reference value is determined based on said relative ratio obtained immediately after the relative position of said focusing lens is fixed to a position where said true focus evaluating value reaches the maximum value.

14. An image sensing apparatus for automatically matching the focus relative to an object, comprising:

image sensing means (2, 8) having a focusing lens and an image sensor for generating a video signal in response to light incident from said object, relative position changing means (3, 4) for changing a relative position in the direction of an optical axis of said focusing lens relative to said image sensor, first focus evaluating value detecting means (35, 37, 38) for detecting every constant time period a level of a first high frequency component in said video signal to supply the same as a first focus evaluating value, second focus evaluating value detecting means (36, 37, 38, 39) for detecting every constant time period a level of a second high frequency component including a component at a frequency which is lower than the frequency of said first high frequency component in said video signal to supply the same as a second focus evaluating value, each of said first and second focus evaluating values being a focus evaluating value which reaches the maximum value in an in-focus position means (39) for detecting a true focus evaluating value to supply the same based on at least one of said first and second focus evaluating values, relative ratio calculating means (41) for calculating a relative ratio of said first and second focus evaluating values, means (40, 100) for controlling said relative position changing means based on said true focus evaluating value so as to drive the relative position of said focusing lens to a position where said true focus evaluating value reaches the maximum value, increase or decrease determining means (41, 42, 43, 44, 45, 46) for determining whether said relative ratio tends to be increased or decreased, and means (100) for controlling said relative position changing means so as to reverse the direction of movement of the relative position of said focusing lens when said increase or decrease determining means determines that the relative ratio tends to be decreased while the relative position of said focusing lens is moved in one direction by said control means.

15. The image sensing apparatus according to claim 14, wherein said first focus evaluating value detecting means comprises first filter means for extracting the level of said first high frequency component in said video signal, and said second focus evaluating value detecting means comprises second filter means for extracting the level of said second high frequency component in said video signal.

16. The image sensing apparatus according to claim 14, wherein said means for detecting the true focus evaluating value comprises switching means for alternatively selecting every said constant time period said first and second focus evaluating values outputted from said first and second focus evaluating value detecting means, first memory means for holding the first focus evaluating value selected by said switching means, second memory means for holding the second focus evaluating value selected by said switching means, and means for adding every said constant time period the newest contents of said first and second memory means to supply the result obtained by the addition as said true focus evaluating value.

17. The image sensing apparatus according to claim 14, wherein said relative ratio calculating means comprises means for calculating a relative ratio of said first focus evaluating value to said focus evaluating value.

18. The image sensing apparatus according to claim 14, wherein said increase or decrease determining means determines that said relative ratio tends to be decreased when it is continuously changed in a decreasing tendency a constant number of times.

19. An image sensing apparatus for automatically matching the focus relative to an object, comprising:
    image sensing means (2, 8) having a focusing lens and an image sensor for generating a video signal in response to light incident form said object,
    relative position changing means (3, 4) for changing a relative position in the direction of an optical axis of said focusing lens relative to said image sensor,
    first focus evaluating value detecting means (35, 37, 38) for detecting every constant time period a level of a first high frequency component in said video signal to supply the same as a first focus evaluating value,
    second focus evaluating value detecting means (36, 37, 38) for detecting every constant time period a level of a second high frequency component including a component at a frequency which is lower than the frequency of said first high frequency component to supply the same as a second focus evaluating value,
    each of said first and second focus evaluating values being a focus evaluating value which reaches the maximum value in an in-focus position,
    means (39) for detecting a true focus evaluating value based on at least one of said first and second focus evaluating values,
    relative ratio calculating means (41) for calculating a relative ratio of said first and second focus evaluating values,
    means (40, 100) for controlling said relative position changing means based on said true focus evaluating value so as to drive the relative position of said focusing lens to a position where said true focus evaluating value reaches the maximum value,
    increase or decrease determining means (41, 42, 43, 44, 45, 46) for determining whether said relative ratio tends to be increased or decreased, and
    means (100) for controlling said relative position changing means so as to prevent the direction of movement of the relative position of said focusing lens from being reversed when said increase or decrease determining means determines that said relative ratio tends to be increased while the relative position said focusing lens is moved in one direction by said control means.

20. The image sensing apparatus according to claim 19, wherein
    said first focus evaluating value detecting means comprises first filter means for extracting the level of said first high frequency component in said video signal, and
    said second focus evaluating value detecting means comprises second filter means for extracting the level of said second high frequency component in said video signal.

21. The image sensing apparatus according to claim 19, wherein said means for detecting the true focus evaluating value comprises
    switching means for alternately selecting every said constant time period said first and second focus evaluating values outputted from said first and second focus evaluating value detecting means,
    first memory means for holding the first focus evaluating value selected by said switching means,
    second memory means for holding the second focus evaluating value selected by said switching means, and
    means for adding every said constant time period the newest contents of said first and second memory means to supply the result obtained by the addition as said true focus evaluating value.

22. The image sensing apparatus according to claim 19, wherein relative ratio calculating means comprises means for calculating a relative ratio of said first focus evaluating value to said second focus evaluating value.

23. The image sensing apparatus according to claim 19, wherein said increase or decrease determining means determines that said relative ratio tends to be increased when it is continuously changed in an increasing tendency a constant number of times.

* * * * *